(12) United States Patent
Caines

(10) Patent No.: US 6,899,568 B2
(45) Date of Patent: May 31, 2005

(54) ELECTRICAL CONNECTOR

(75) Inventor: Arturo Caines, Hanover Park, IL (US)

(73) Assignee: Cinch Connectors, Inc., Lombard, IL (US)

( * ) Notice: Subject to any disclaimer, the term of this patent is extended or adjusted under 35 U.S.C. 154(b) by 0 days.

(21) Appl. No.: 10/341,047

(22) Filed: Jan. 13, 2003

(65) Prior Publication Data

US 2004/0137797 A1 Jul. 15, 2004

(51) Int. Cl.[7] ............................................. H01R 24/00
(52) U.S. Cl. ........................ 439/660; 439/700; 439/66
(58) Field of Search ................................. 439/660, 138, 439/310, 374, 736, 65, 34–35, 620, 604–606, 874–876, 66, 700; 361/280, 283.1

(56) References Cited

U.S. PATENT DOCUMENTS

| | | | | |
|---|---|---|---|---|
| 4,203,640 A | * | 5/1980 | Bice et al. | 439/139 |
| 4,924,701 A | * | 5/1990 | Delatorre | 73/152.52 |
| 5,044,977 A | * | 9/1991 | Vindigni | 439/374 |
| 5,093,593 A | * | 3/1992 | Philipp | 310/71 |
| 5,127,837 A | * | 7/1992 | Shah et al. | 439/71 |
| 5,344,331 A | * | 9/1994 | Hoffman et al. | 439/138 |
| 6,669,490 B1 | * | 12/2003 | DelPrete et al. | 439/86 |

* cited by examiner

Primary Examiner—P. Austin Bradley
Assistant Examiner—Edwin A. Leon
(74) Attorney, Agent, or Firm—Leydig, Voit & Mayer, Ltd.

(57) ABSTRACT

The electrical connector includes a plurality of contact assemblies mounted to a housing. The contact assemblies can include a contact disc, a resilient contact, and a plunger. The housing includes a plurality of cavities. Each cavity includes first and second openings respectively communicating with a pair of opposing surfaces of the housing. The electrical connector can be used in an electrical device, such as, a sensor, for example. The electrical device can be mated to another electrical component.

69 Claims, 21 Drawing Sheets

ELECTRICAL CONNECTOR

FIELD OF THE INVENTION

This invention relates generally to electrical connectors and more particularly to an electrical connector for a sensor.

BACKGROUND OF THE INVENTION

Electrical connectors are used to electrically connect one component to another component. Depending upon the particular application, an electrical connector may be required to satisfy certain criteria, such as, contact resistance, compliance or deflection distance, force required to achieve compliance, ease of assembly, and cost to manufacture.

A sensor is a device which senses the state of an environment. For example, a sensor can sense the temperature or pressure. Sensors can be used in vehicles, such as automobiles, to sense the temperature of the engine or the hydraulic pressure in a braking system. The sensor can be connected to a processing unit, such as, a computer, by wires and a printed circuit board. Economic considerations make it desirable for the sensor to be connected to the processing unit in a convenient and low cost manner.

In one design, a flexible strip has been used as a connector. The strip is mechanically secured by solder. In another design, wire bonding to lead frames is used to provide the electrical connection. Both of these designs yield a fairly large package and require a complex assembly process.

In view of the foregoing, there exist various needs in the art. One such need is for an electrical connector which is easily mounted to provide a reliable electrical connection. Another need is for a compact, low profile electrical connector.

SUMMARY OF THE INVENTION

The electrical connector can be used as an interposer in a fluid pressure sensor for an electronic braking system ("EBS"), for example. The electrical connector provides a reliable mechanical pressure connection to a pad on a printed circuit board, for example. The electrical connector is readily installed and can be made using conventional manufacturing techniques.

There is provided an electrical connector including an insulative housing and a plurality of axially resilient contact assemblies mounted thereto. The electrical connector can be used in an electrical device, such as a sensor, for example, including a pressure sensor or a temperature sensor. The electrical device can be mated to another electrical component. The electrical device can be used in a centralized EBS application and a decentralized EBS application, for example.

The housing of the electrical connector according to the present invention can include a body portion, a projecting portion, and a plurality of cavities corresponding to the plurality of contact assemblies. Each cavity has a first and a second opening. The projecting portion can be configured to selectively limit the compressive deflection of the contact assemblies.

In another aspect of the invention, the housing can include a collar and a shroud. The collar can include an annular groove. The electrical connector can further include an O-ring seal disposed about the annular groove. The shroud can includes an open end and a chamfered locking tab.

In yet other embodiments, the housing can include a first part and a second part, the parts being mounted together to define the housing. The first and the second parts each having a plurality of openings which respectively align to define the cavities.

The contact assembly is resilient such that each contact assembly can be compressively engaged to exert a responsive contact pressure. The contact assemblies are mounted to the housing and are disposed in the respective cavities. Each contact assembly can include a resilient contact and a reciprocally movable plunger. The plunger is accessible through one of the openings of the cavity.

In another aspect of the invention, the contact assembly can include a contact disc. The resilient contact can be disposed between the contact disc and the plunger. The contact disc can be accessible through one of the openings of the cavity, and the plunger can be accessible through the other opening of the cavity.

In some embodiments, the contact disc can include a body portion and a tab. In other embodiments, the contact disc can include a blade extending from the body portion. The blade can include an end portion that extends from the body portion of the housing. In embodiments where the housing includes a shroud, the end portion of the blade can be disposed within the shroud.

The contact disc of each contact assembly can be integrally mounted to the housing by insert molding. The contact discs can be connected together by a frangible connecting strip while being mounted to the housing.

The resilient contact can be a resiliently wadded conductor comprising a resiliently and randomly wadded single thin gauge electrically conductive wire. The plunger can include a base and an end portion. The resilient contact and the plunger can be mounted to the housing by insertion into one of the openings of the cavity. An area of the projecting portion adjacent the opening of the cavity can be modified to reduce the size of the opening to thereby retain the resilient contact and the plunger in the cavity while permitting free passage of the end portion of the plunger.

In one aspect of the invention, the electrical device includes the electrical connector, a pressure input assembly, a printed circuit board disposed between the pressure input assembly and the electrical connector, and a shell. The electrical connector and the printed circuit board can be disposed in the shell. The projecting portion of the electrical connector can be adjacent the printed circuit board. The contact assemblies of the electrical connector can be electrically connected to a plurality of contact pads on the printed circuit board.

The inventive features of the present invention will become apparent to one of ordinary skill in the art upon reading the detailed description, in conjunction with the accompanying drawings, provided herein.

Reference is sometimes made herein to the "top," "bottom," "upper," "lower," or other regions of the electrical connector and its various components. It should be understood that these terms are used solely for convenient reference, inasmuch as the electrical connector can be used omnidirectionally.

DESCRIPTION OF EMBODIMENTS OF THE INVENTION

Figure 1:
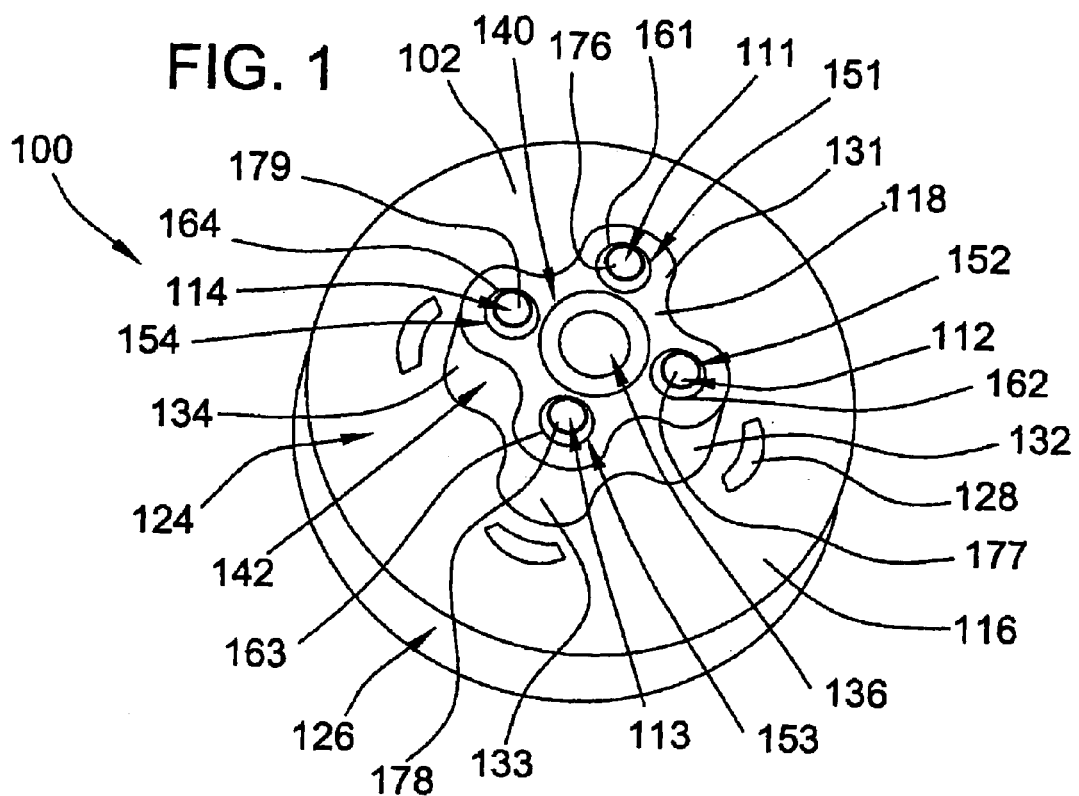
FIG. 1 is a bottom perspective view of an electrical connector in accordance with the present invention.
Figure 2:
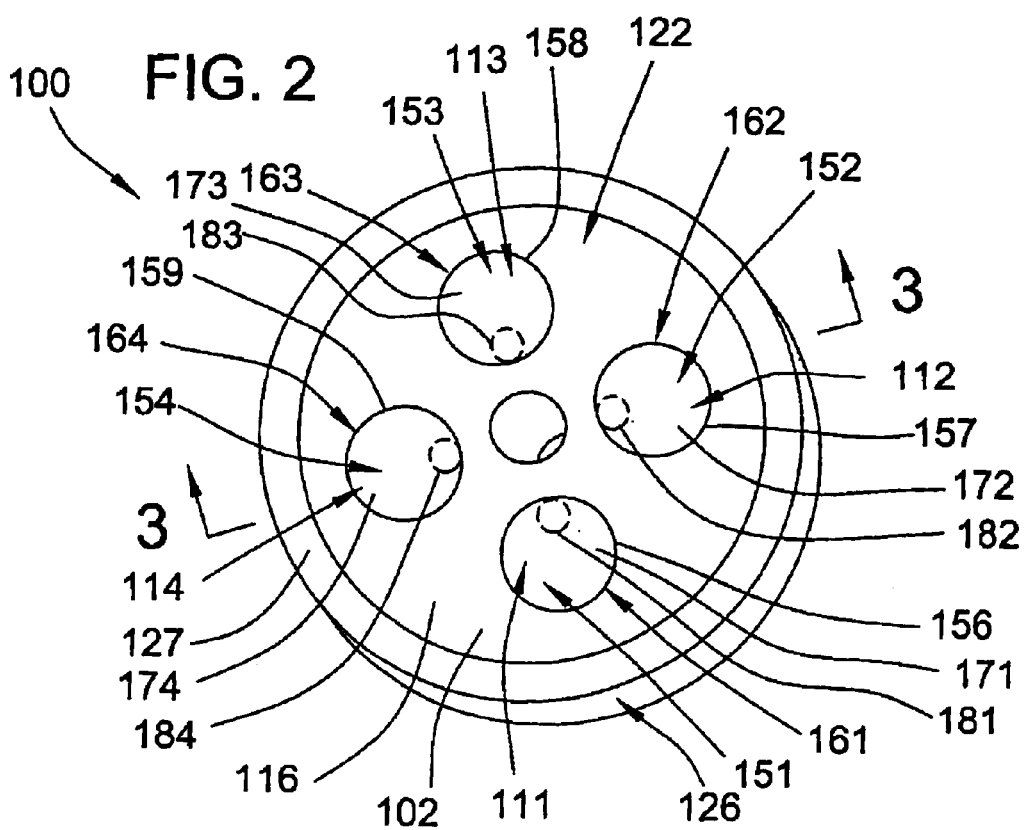
FIG. 2 is a top perspective view of the connector of FIG. 1.
Figure 3:
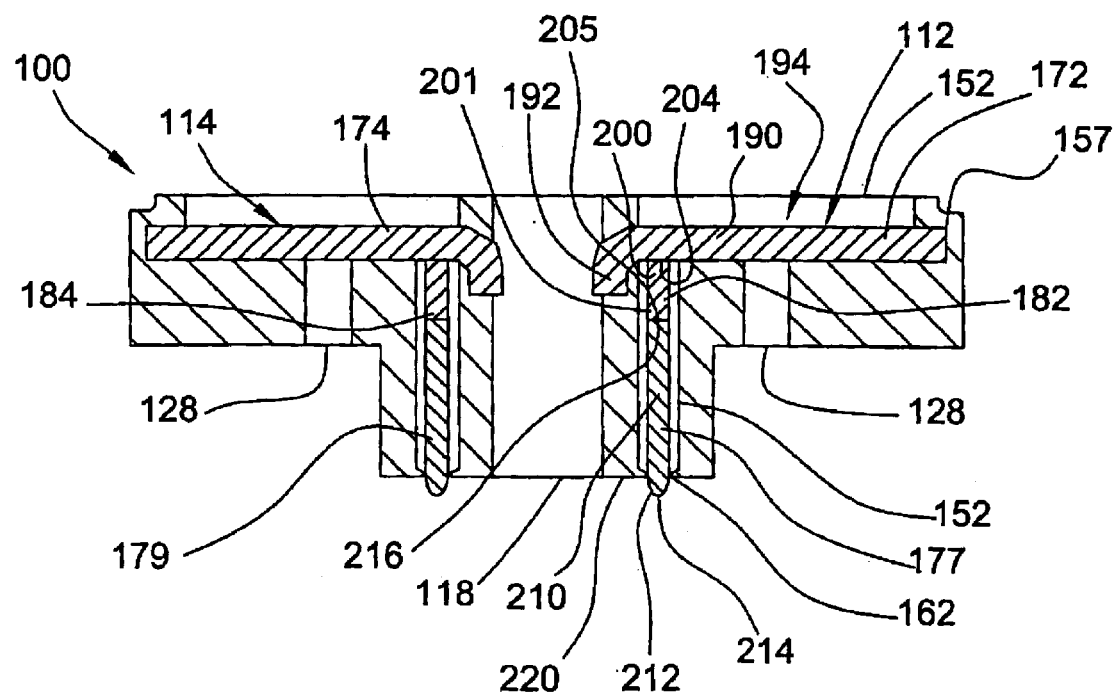
FIG. 3 is a cross-sectional view of the connector taken along line 3—3 in FIG. 2.
Figure 4:
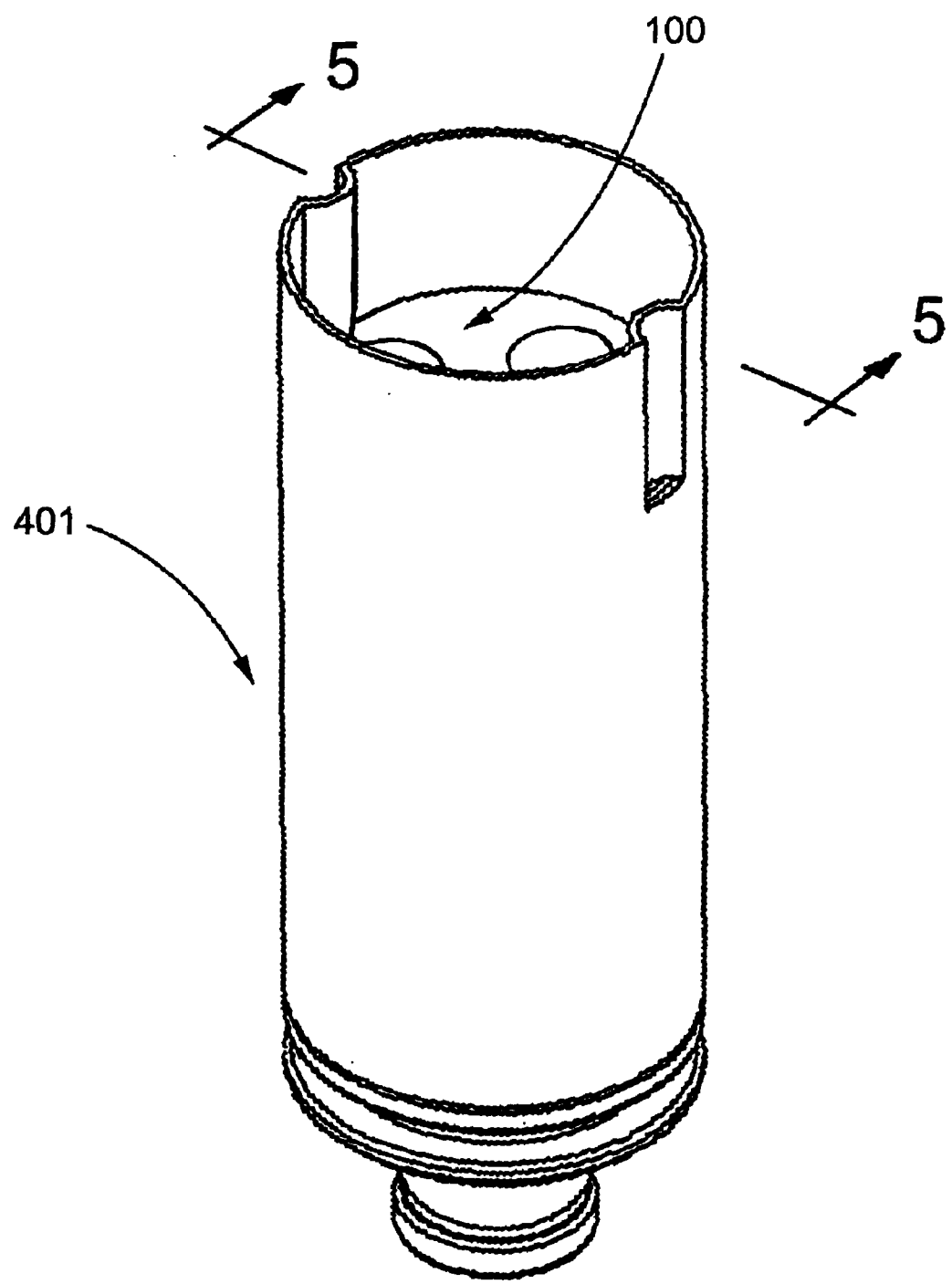
FIG. 4 is a perspective view of a pressure sensor with the electrical connector of FIG. 1 installed therein.

Turning now to the drawings, there is shown in FIGS. 1–3 an illustrative electrical connector 100 according to the present invention. The electrical connector 100 can provide a reliable mechanical pressure connection between itself and the component to which it is connected. The electrical connector 100 is compact, presenting a low-profile configuration. The electrical connector 100 can be used in a sensor, for example, as shown in FIG. 4. In one illustrative application, the electrical connector 100 can be used in a de-centralized electronic brake system ("EBS").

Referring to FIGS. 1 and 2, the connector 100 includes a housing 102 and a plurality of axially resilient electrical contact assemblies 111, 112, 113, 114. The contact assemblies 111, 112, 113, 114 are mounted to the housing 102. The contact assemblies 111, 112, 113, 114 are electrically conductive and are resilient such that the assemblies can be compressively engaged to exert a responsive contact pressure. The housing 102 can act as an electrical insulator. For example, the housing 102 can act to maintain the contact assemblies in electrical isolation from each other.

Referring to FIGS. 1 and 2, the housing 102 may include a body portion 116 and a projecting portion 118. The body portion 116 may be generally circular and disc-shaped. The body portion 116 includes a first surface 122, a second surface 124, and a peripheral surface 126 therebetween. The first surface 122 can include an annular groove 127 extending therearound. The groove 127 can be adjacent to the peripheral surface 126. The groove 127 can be configured to accommodate an o-ring, which can act to provide a seal between the connector 100 and an object to which it is engaged. The peripheral surface 126 defines the outer circumference of the housing 102.

The body portion 116 also includes a plurality of passages 128. The passages 128 can be provided to facilitate the manufacture of the connector 100 as explained in greater detail below. In the illustrative embodiment, each passage 128 is associated with a respective contact assembly 111, 112, 113, 114. The passages 128 can be configured such that they extend between the second surface 124 and the respective contact assembly 111, 112, 113, 114.

Referring to FIG. 1, the projecting portion 118 protrudes from the body portion 116. The projecting portion 118 projects from the second surface 124 of the body portion 116. The projecting portion 118 is generally cruciate-shaped and includes a plurality of segments 131, 132, 133, 134 which extends from a centrally-disposed bore 136. The projecting portion 118 includes a mating surface 140 and a perimeter surface 142. The perimeter surface 142 is bounded by the mating surface 140 and the second surface 124 of the body portion 116.

Referring to FIG. 2, the bore 136 is provided to facilitate the perforating of the contact discs 171, 172, 173, 174. The contact discs 171, 172, 173, 174 can be connected together for assembly purposes by a frangible connecting strip. The connecting strip can be generally X-shaped and disposed over the bore 136. The connecting strip can be provided to retain the discs 171, 172, 173, 174 in a predetermined, spaced relationship to each other during an insert molding process to make the housing 102, for example. The connecting strip can be broken in a punching operation, for example, to sever the strip, thereby electrically and mechanically separating the contact discs 171, 172, 173, 174. The bore 136 can be defined during a molding process for making the housing 102. The punching operation can take place during the molding process.

Referring to FIGS. 1 and 2, the housing 102 includes a cavity 151, 152, 153, 154 for each respective contact assembly 111, 112, 113, 114. Each cavity 151, 152, 153, 154 includes a respective first opening 156, 157, 158, 159, which communicates with the first surface 122 of the body portion 116, and a respective second opening 161, 162, 163, 164, which communicates with the mating surface 140 of the projecting portion 118. The cavities 151, 152, 153, 154 are similar to each other. Accordingly, it will be understood that the description of one cavity is applicable to any of the other cavities.

The contact assemblies 111, 112, 113, 114 are radially disposed in a substantially uniform manner about the central bore 136 of the housing 102. The contact assemblies 111, 112, 113, 114 are disposed about 90° radially apart from each adjacent contact assembly. The contact assemblies 111, 112, 113, 114 are retentively engaged with the housing 102 and are disposed in the cavities 151, 152, 153, 154, respectively.

Referring to FIGS. 1 and 2, the illustrative contact assemblies 111, 112, 113, 114 of the electrical connector 100 respectively may include a contact disc 171, 172, 173, 174, a reciprocally movable plunger 176, 177, 178, 179, and a resilient contact 181, 182, 183, 184 disposed therebetween. Referring to FIG. 2, the contact discs 171, 172, 173, 174 are respectively accessible through the first openings 156, 157, 158, 159 of the housing 102. Referring to FIG. 1, the plungers 176, 177, 178, 179 are respectively accessible through the second openings 161, 162, 163, 164 of the housing 102.

The illustrative contact assemblies 111, 112, 113, 114 are similar in construction and function to each other. Accordingly, it will be understood that the description of any contact assembly is applicable to each of the other contact assemblies. Only the second and fourth contact assemblies 112, 114 will be discussed in detail. It will be understood that the description of the second and fourth contact assemblies is applicable to each of the other contact assemblies, as well. In other embodiments, each contact assembly can be identical to the other contact assemblies. In yet other embodiments, each contact assembly can be different from the other contact assemblies.

Referring to FIG. 3, the second contact assembly 112 may include the contact disc 172, the resilient contact 182, and the reciprocally movable plunger 177. The contact disc 172 is electrically conductive and includes a generally planar body portion 190 and a tab 192 that extends from the body portion 190. The tab 192 is disposed at about a 90° angle with respect to the body portion 190. The body portion 190 includes a contact surface 194 that is accessible through the first opening 157 of the second cavity 152.

The resilient contact 182 is resiliently flexible. The resilient contact 182 may be a wadded wire contact, an elastomeric contact, or a stamped contact, for example. In embodiments where the resilient contact is a wadded wire contact, the resilient contact is typically in the form of an elongated cylindrical contact element comprising a resiliently and randomly wadded single thin gauge electrically conductive wire.

The resilient contact 182 includes first and second ends 200, 201 that respectively define first and second contact surfaces 204, 205. The resilient contact 182 is disposed between the contact disc 172 and the plunger 177. The first contact surface 204 is electrically engaged with the contact disc 172. The second contact surface 205 is electrically engaged with the plunger 177.

The plunger 177 may include a base 210 and an end portion 212. The base 210 is cylindrical. The end portion 212 tapers to a rounded plunger contact surface 214. The end portion 212 is generally conical, thereby imparting the plunger 177 with a "bullet" shape. An end 216 of the base 210 contacts the second contact surface 205 of the resilient contact 182. At least some of the end portion 212 protrudes from the second opening 162 of the second cavity 152. The plunger contact surface 214 is accessible through the second opening 162. The size of the base 210 is configured such that it cannot pass through the second opening 162. The resilient contact 182 and the plunger 177 are sufficiently freely movable axially of the cavity 152 such that the resilient contact 182 maintains contact with the adjacent surface of the contact disc 172 and with the base 210 of the plunger 177 while permitting and providing resilient axial movement of the plunger 177 within the ambit of axial movement corresponding generally to the length of the projecting part of the end portion 212.

Referring to FIG. 3, the fourth contact assembly 114 includes the contact disc 174, the resilient contact 184, and the plunger 179. The fourth contact assembly 114 is similar to the second contact assembly 112.

In other embodiments, the respective sizes of the resilient contacts 184, 182 and the plungers 179, 177 can be different. For example, the resilient contact 184 of the fourth contact assembly 114 can be larger than the resilient contact 182 of the second contact assembly 112. The plunger 179 of the fourth contact assembly 114 can be smaller than the plunger 177 of the second contact assembly 112. In other embodiments, the size of the resilient contact and/or the plunger can be varied in one or more contact assemblies.

Referring to FIGS. 1 and 2, each illustrative contact assembly 111, 112, 113, 114 is mounted to the housing 102 in the same manner. Accordingly, it will be understood that the description of the mounting of any contact assembly is applicable to each of the other contact assemblies, as well. In other embodiments, the mounting of each contact assembly can be varied as a group or separately.

Referring to FIG. 3, the contact disc 172 of the second contact assembly 112 can be integrally mounted to the housing 102 by insert molding, for example. In the mold, the contact disc 172 can be held in place at a predetermined location by a pair of metal projections that extend toward each other to hold the contact disc 172 therebetween. The two metal projections can engage the contact disc 172 such that the disc 172 is held in place at the predetermined location during a molding process for making the housing 102. The passage 128 can be defined by one of the metal projections of the mold. The metal projections can support the contact discs during the breaking of the frangible strip connecting the contact discs.

Referring to FIG. 3, the resilient contact 182 and the plunger 177 of the second contact assembly 112 can be mounted by insertion into the second opening 162 of the second cavity 152, for example. An area 220 of the projecting portion 118 adjacent the second cavity 152 is modified, as by cold-form staking inwardly, to reduce the size of the second opening 162 of the second cavity 152, thereby retaining the base 210 of the plunger 177 in the second cavity 152 while permitting free passage of the end portion 212 of the plunger 177, as illustrated in FIG. 3. U.S. Pat. No. 5,382,169 further illustrates and describes cold-form staking with respect to resilient contact and plunger combinations and is incorporated herein by reference in its entirety.

Referring to FIG. 1, the illustrative electrical connector 100 includes four contact assemblies. The contact assemblies 111, 112, 113, 114 are disposed in substantially uniform spaced relation to each other. In other embodiments, the number and/or the spacing of the contact assemblies can be varied. The components of the contact assemblies are each made from a copper alloy, for example, or any other suitable electrically-conductive material. Neither the contact assemblies nor the individual components of a specific contact assembly need be made from the same material. In other embodiments, the number and/or location of contact assemblies can be varied. The illustrative housing 102 is made from a high performance thermoplastic, such as, a liquid crystal polymer, nylon, or polybutylene terephthalate (PBT), for example. In other embodiments, the housing 102 can be made from any other suitable dielectric material.

Referring to FIG. 4, the electrical connector 100 according to the present invention can be assembled into an electrical device 401, such as, a temperature sensor or a pressure sensor, for example. The illustrative electrical device 401 is a pressure sensor. The electrical device 401 can be used in a de-centralized electronic brake system ("EBS")

where the electrical device is disposed in close relation to a brake caliper. In such an EBS application, each brake caliper can be associated with its own electrical device 401. Typically there is one caliper for each wheel on a vehicle. The de-centralization of the EBS can provide for a quicker response time during a braking operation which in turn will translate into a shorter stopping distance.

Figure 5:
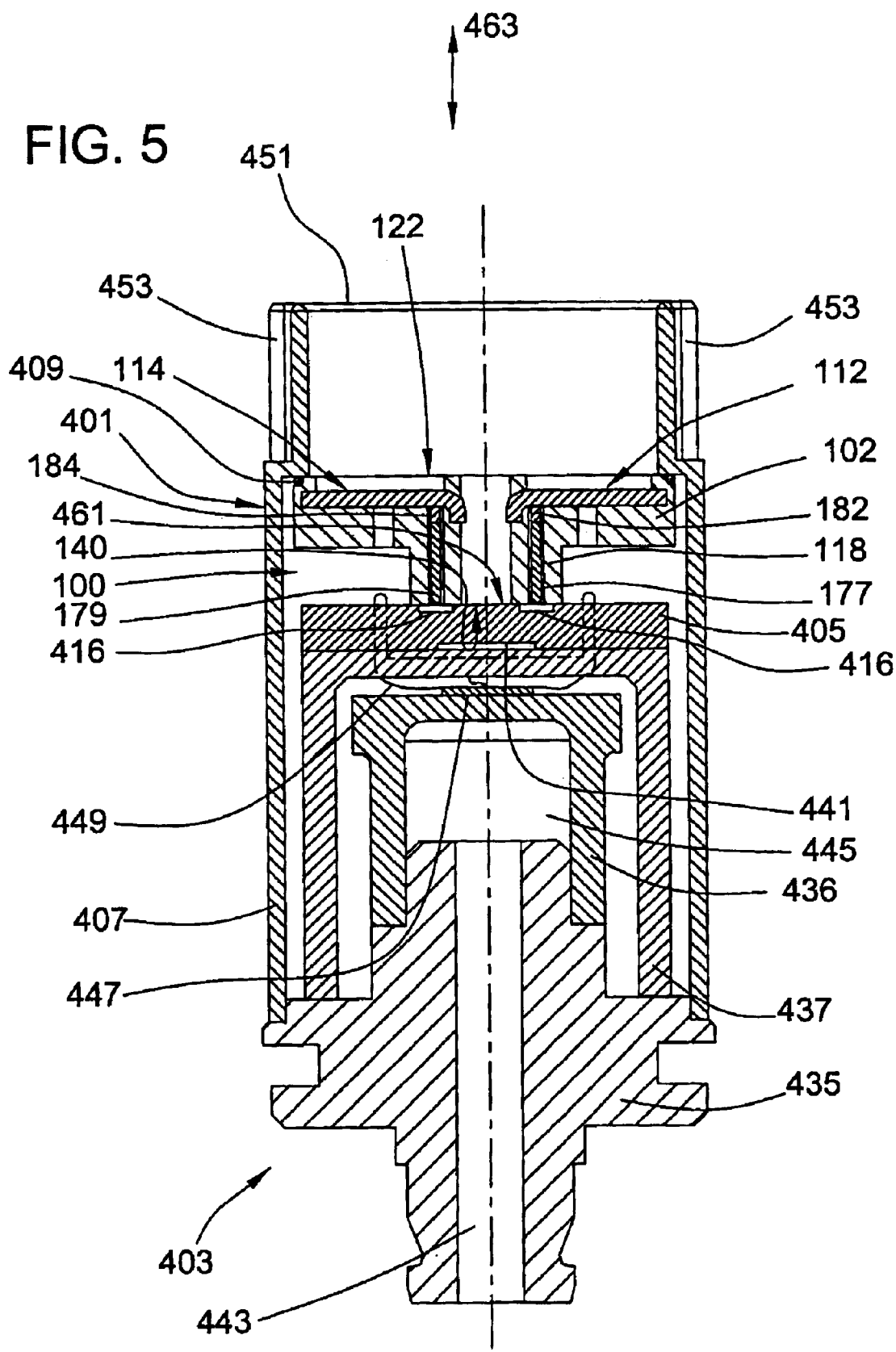
FIG. 5 is a cross sectional view of the pressure sensor taken along line 5—5 in FIG. 4.

Referring to FIG. 5, the electrical device 401 includes the electrical connector 100, a pressure input assembly 403, a printed circuit board 405, which is disposed between the pressure input assembly 403 and the electrical connector 100, a shell 407, and an o-ring 409 disposed between the electrical connector 100 and the shell 407. The projecting portion 118 of the electrical connector 100 is adjacent the printed circuit board 405. The o-ring 409 can act to provide a seal between the shell 407 and the electrical connector 100.

The four contact assemblies of the electrical connector 100 are electrically connected to a plurality of contact pads 416 on the printed circuit board 405. The four contact assemblies of the electrical connector 100 can provide four separate electrical connections to the respective four contact pads 416 of the printed circuit board 405. As shown in FIG. 5, the plungers 177, 179 of the second and fourth contact assemblies 112, 114, respectively, are separately in contact with the respective contact pads 416.

The pressure input assembly 403 includes an end cap 435, a pressure barrel 436, and an interface member 437. The pressure barrel 436 is mounted to the end cap 435. The interface member 437 is mounted to the end cap 435. The printed circuit board 405 is supported by the interface member 437.

The printed circuit board 405 includes a central processing unit 441 in the form of an integrated circuit chip ("IC chip"). The IC chip 441 is electrically connected to the four contact pads 416 of the printed circuit board 405 which are in turn respectively electrically connected to the four contact assemblies of the electrical connector 100. The IC chip 441 is cooperatively arranged with the pressure input assembly 403.

Pressurized material, such as, brake fluid, for example, can flow through a bore 443 in the end cap 435 into a cavity 445 and act upon the pressure barrel 436, which in turn acts upon a wheatstone bridge 447 disposed between the pressure barrel 436 and the interface member 437. The wheatstone bridge 447 is electrically connected to the IC chip 441 via a plurality of leads 449 extending through the printed circuit board 405. The leads 449 extend from the wheatstone bridge 447 and are electrically connected to the IC chip 441 through traces on the printed circuit board 405, for example.

As the pressure of the brake fluid varies so in turn does the force generated by the brake fluid upon the pressure barrel 436. The wheatstone bridge 447 can produce a variable electrical signal that varies in a known fashion according to the amount of force applied upon the pressure barrel 436, thereby providing an electrical signal that can indicate the magnitude of pressure of the brake fluid in the pressure input assembly 403. The wheatstone bridge 447 sends the electrical signal to the IC chip 441 which in turn can control a braking mechanism, for example, based upon the pressure of the brake fluid.

The shell 407 is mounted to the pressure input assembly 403 and houses the printed circuit board 405 and the electrical connector 100. The shell 407 defines an open end 451 and includes a plurality of detents 453 extending from the open end 451 along the surface of the shell 407. The electrical device 401 can be mated with another component.

The open end 451 of the shell 407 provides access to the contact discs of the electrical connector 100. The detents 453 are provided to retentively engage the electrical connector to positively establish an electrical connection between the electrical connector and the printed circuit board 405 via the contact assemblies. The detents 453 can also provide an indexing feature to facilitate the positioning of the electrical device 401 with respect to a mating component.

As shown in FIG. 5, the mating surface 140 of the electrical connector 100 is configured such that it can engage a top surface 461 of the printed circuit board 405. The electrical connector 100 can be compressed by the detents 453 and the top surface 461 of the printed circuit board 405, thereby imparting compressive forces along a vertical axis 463 upon the contact assemblies.

In FIG. 5, the contact assemblies 112, 114 are in a compressed position wherein the plungers 177, 179 are displaced from a normal position, shown in FIG. 3, toward the first surface 122 of the housing 102. The resilient contacts 182, 184 are compressed to accommodate the displacement of the plungers 177, 179, respectively. The mating surface 140 of the projecting portion 118 may be in contact with the top surface 461. The plungers 182, 184 are in contact with contact pads 416. The contact assemblies 112, 114 are compressed along the vertical axis 463. The contact assemblies can be placed in other compressed positions.

During the compressive engagement of the connector 100 with the detents 453 and the printed circuit board 405, each of the contact assemblies of the electrical connector 100 acts against the respective contact pads 416 of the printed circuit board 405. Each of the contact assemblies compresses. The resilient contacts resiliently compress to accommodate the movement of the plungers. The plungers can move toward the first surface 122 of the housing 102 until the projecting portion 118 engages the top surface 461.

The projecting portion 118 can act to withstand the compressive force between the connector 100 and the top surface 461 without deflecting, thereby preventing further compressive movement of the contact assemblies. In other embodiments, the size of the projecting portion 118 and/or the selected length of allowed compression can be varied.

Figure 6:
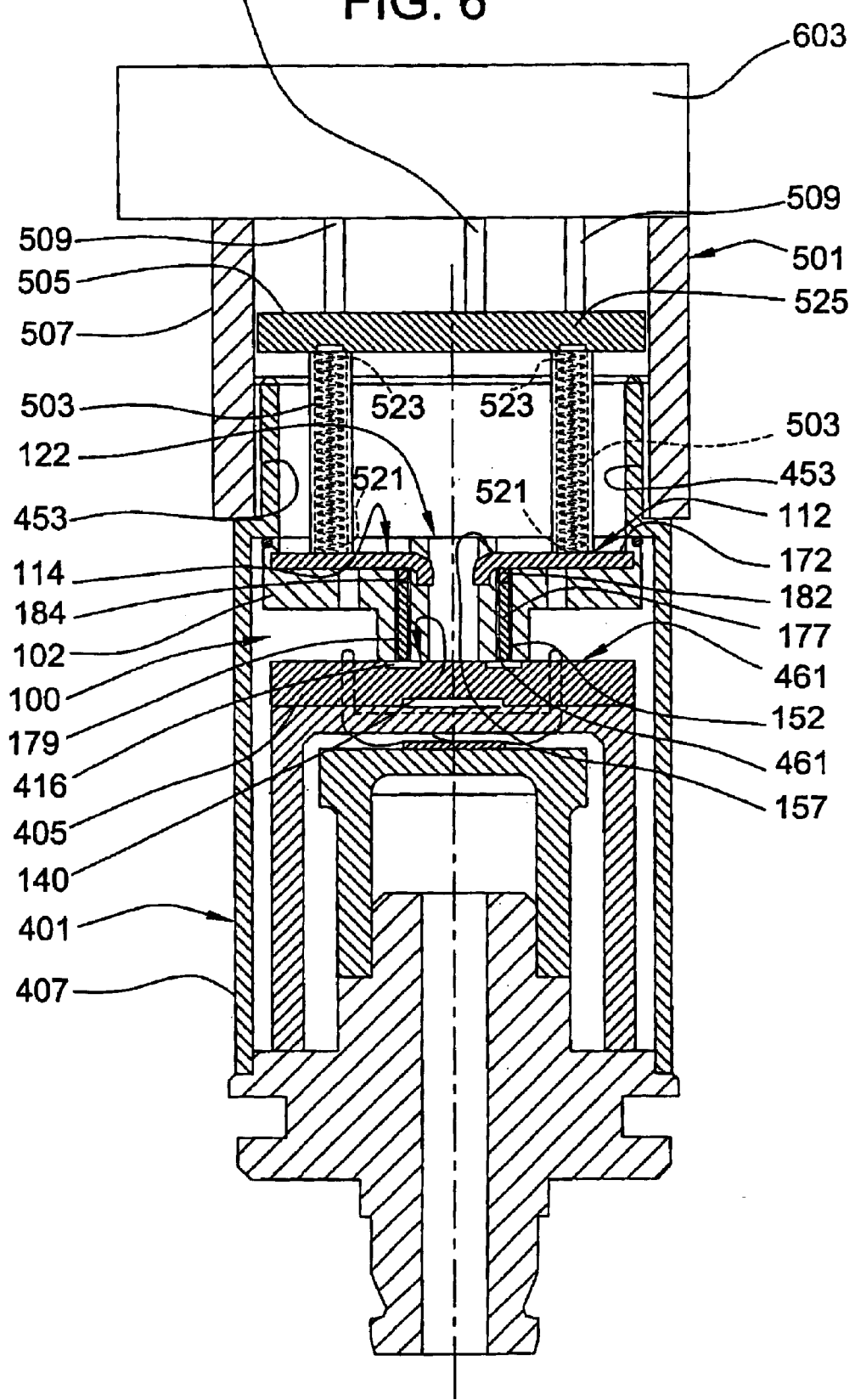
FIG. 6 is a cross-sectional view of the pressure sensor as in FIG. 5 shown mounted to an electrical component.

Referring to FIG. 6, the electrical device 401 can be mated with an electrical component 501 to provide an electrical connection between the electrical device 401 and the component 501. The component 501 includes a plurality of helical spring contacts 503, a printed circuit board 505, a housing 507, and a plurality of wires 509. The housing 507 engages the detents 453 of the shell 407 to mount the electrical device 401 to the electrical component 501. The electrical component 501 can be mounted in turn to a brake caliper 603.

The component 501 and the device 401 can be mated together such that the component 501 is electrically connected to the electrical connector 100. In the illustrative embodiment, the number of helical spring contacts 503 corresponds to the number of contacts in the electrical connector 100, i.e., four. Each helical spring contact 503 includes a first end 521 and a second end 523. With respect to the second contact assembly 112, the first end 521 of the helical spring contact 503 is electrically connected to the contact disc 172. The first end 521 can fit within the first opening 157 of the second cavity 152 to contact the contact disc 172. The second end 523 is electrically connected to a contact pad 525 of the printed circuit board 505 disposed in the device 501. The other three helical spring contacts 503 are similarly arranged with respect to the other three contact assemblies and the printed circuit board 505. The four helical spring contacts 503 can provide separate electrical connections to the respective four contact assemblies of the electrical connector 100. The four wires 509 are separately electrically connected to the four contact pads 525 which are electrically connected to the four helical spring contacts 503. The wires 509 can be electrically connected to a plurality of brake mechanisms associated with the brake caliper 603.

Figure 7:
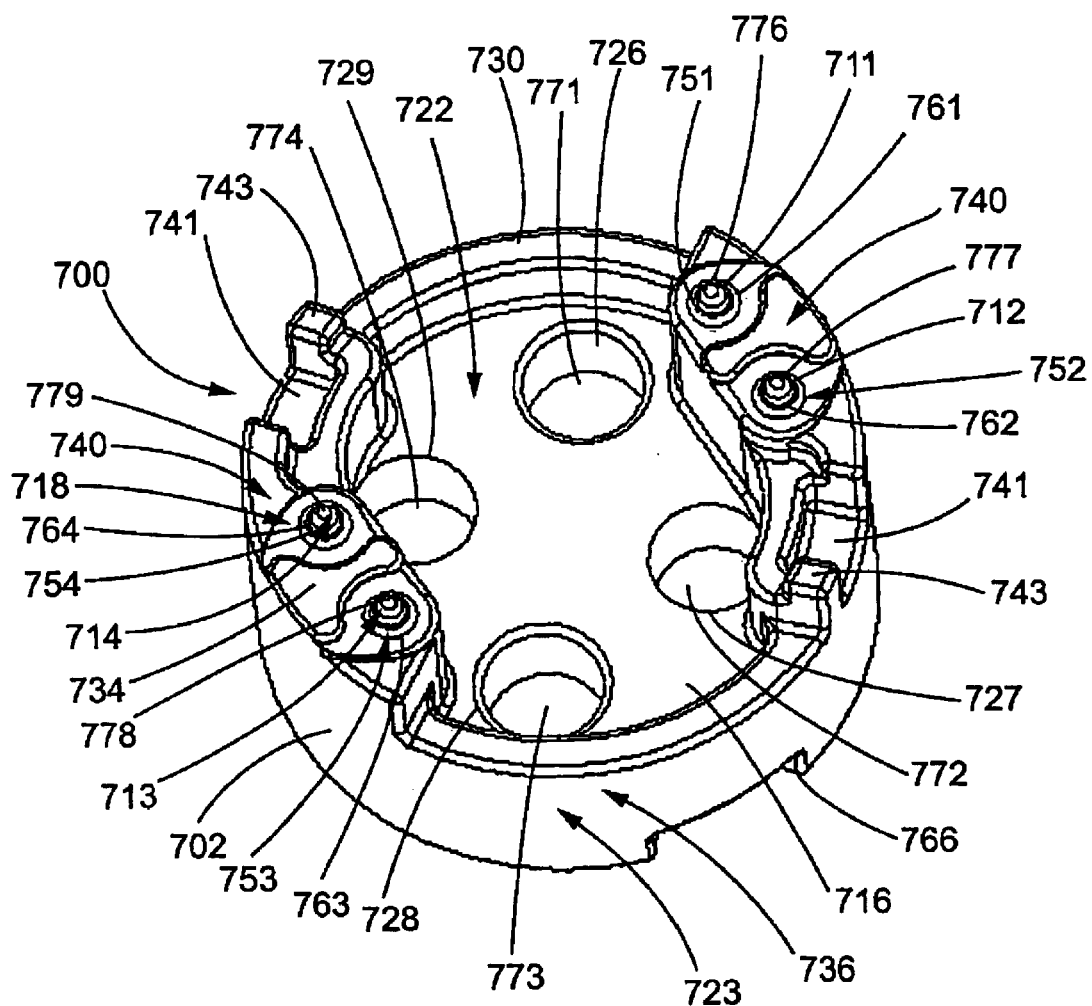
FIG. 7 is a bottom perspective view of another embodiment of an electrical connector in accordance with the present invention.

Referring to FIGS. 7–10, another embodiment of an electrical connector 700 according to the present invention is shown. Referring to FIG. 7, the connector 700 includes a housing 702 and a plurality of axially resilient electrical contact assemblies 711, 712, 713, 714. The contact assemblies 711, 712, 713, 714 are mounted to the housing 102. The contact assemblies 711, 712, 713, 714 are electrically conductive and are resilient such that the assemblies can be compressively engaged to exert a responsive contact pressure. The housing 702 can act as an electrical insulator. For example, the housing 702 can act to maintain the contact assemblies in electrical isolation from each other.

Figure 8:
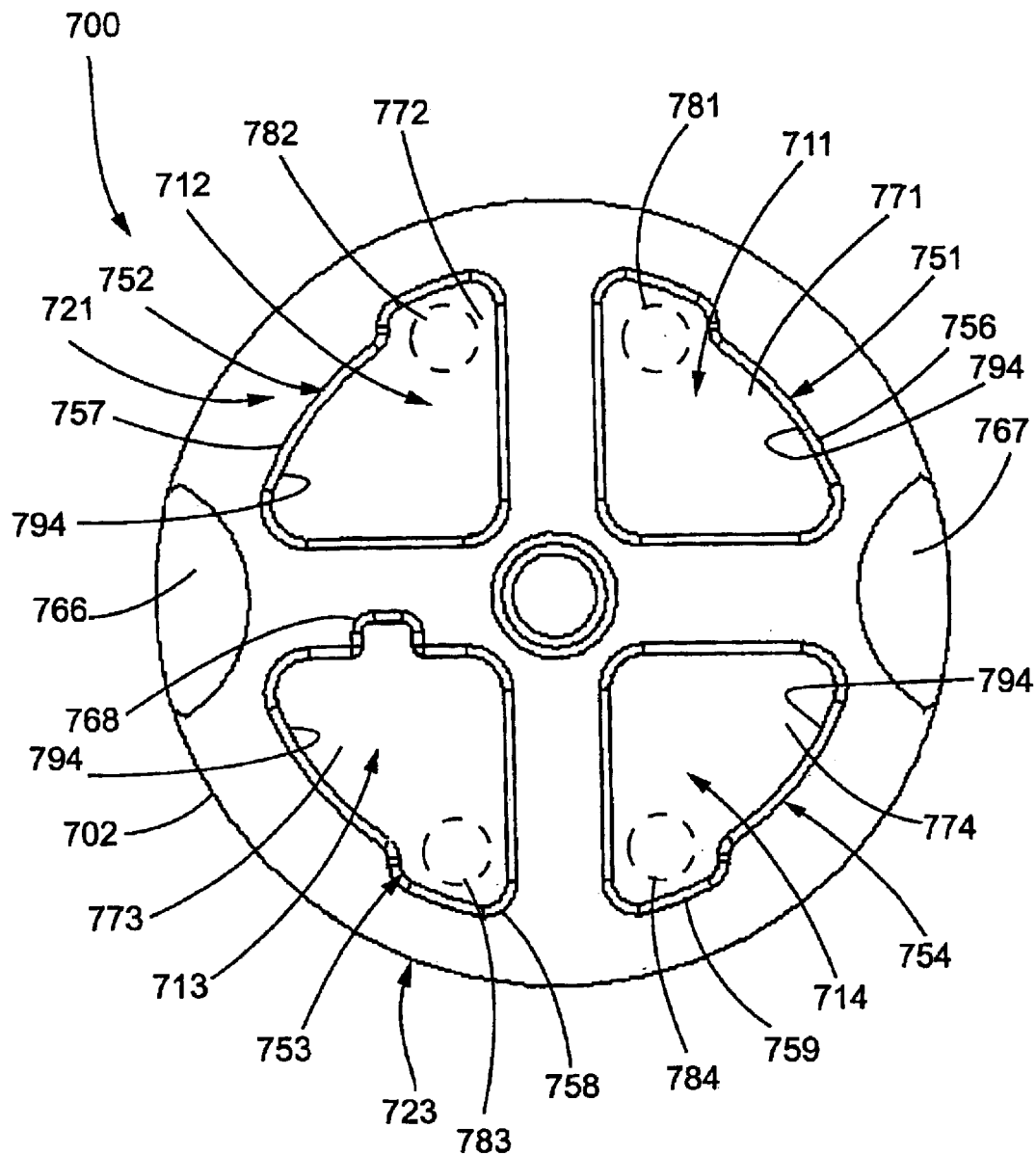
FIG. 8 is a top plan view of the connector of FIG. 7.

Referring to FIGS. 7 and 8, the housing 702 includes a body portion 716 and a projecting portion 718. The body portion 716 is generally circular and disc-shaped. The body portion 716 includes a first surface 721, a second surface 722, and a peripheral surface 723. The peripheral surface 723 defines the outer circumference of the housing 702.

Referring to FIG. 7, the body portion 702 includes a plurality of bores 726, 727, 728, 729. The four bores 726, 727, 728, 729 are radially disposed in spaced relation to each other. The bores 726, 727, 728, 729 are disposed about 90° radially apart from each adjacent bore.

The projecting portion 718 projects from the second surface 722 of the body portion 716. The projecting portion 718 includes an annular ring 730 and a first and a second projection 733, 734. The ring 730 is disposed on the outer circumference of the body portion 716 and has an outer surface 736 that coincides with the peripheral surface 723.

The projections 733, 734 extend from the ring 730 and the body portion 716. The projections 733, 734 oppose each other and are similar to each other. Each projection 733, 734 includes a mating surface 740, a recess 741, and a post 743. The first and second contact assemblies 711, 712 are disposed in the first projection 733. The third and fourth contact assemblies 713, 714 are disposed in the second projection 734.

Referring to FIGS. 7 and 8, the housing 702 includes a cavity 751, 752, 753, 754 for each respective contact assembly 711, 712, 713, 714. Referring to FIG. 8, each cavity 751, 752, 753, 754 includes a respective first opening 756, 757, 758, 759, which communicate with the first surface 721 of the body portion 716. Referring to FIG. 7, the first and second cavities 751, 752 include a respective second opening 761, 762, which communicates with the mating surface 740 of the first projection 733. The third and fourth cavities 753, 754 include a respective second opening 763, 764, which communicates with the mating surface 740 of the second projection 734. The contact assemblies 711, 712, 713, 714 are retentively engaged with the housing 702 and are disposed in the cavities 751, 752, 753, 754, respectively.

Referring to FIG. 8, the body portion 716 includes first and second detents 766, 767. The detents 766, 767 oppose each other and are disposed oh the first surface 721. The detents 766, 767 are similar to each other.

The first opening 758 of the third cavity 753 includes a flag portion 768. The first openings 75.6, 757, 759 of the other cavities 751, 752, 754, respectively, are similar to each other and do not include a flag portion. The flag portion 768 is disposed in a non-symmetrical position, thereby imparting a polarity upon the electrical connector 700 to aid in the electrical connection of the electrical connector 700 to another part. The flag portion 768 can serve as a visual and a physical polarity identifier by providing an indication of the orientation of the contact assemblies 711, 712, 713, 714 in the cavities 751, 752, 753, 754. In use, the user can locate the desired orientation of the electrical connector 700 by locating the flag portion 768 in a predetermined position.

Referring to FIGS. 7 and 8, the illustrative contact assemblies 711, 712, 713, 714 respectively include a contact disc 771, 772, 773, 774, a reciprocally movable plunger 776, 777, 778, 779, and a resilient contact 781, 782, 783, 784 disposed therebetween.

Figure 9:
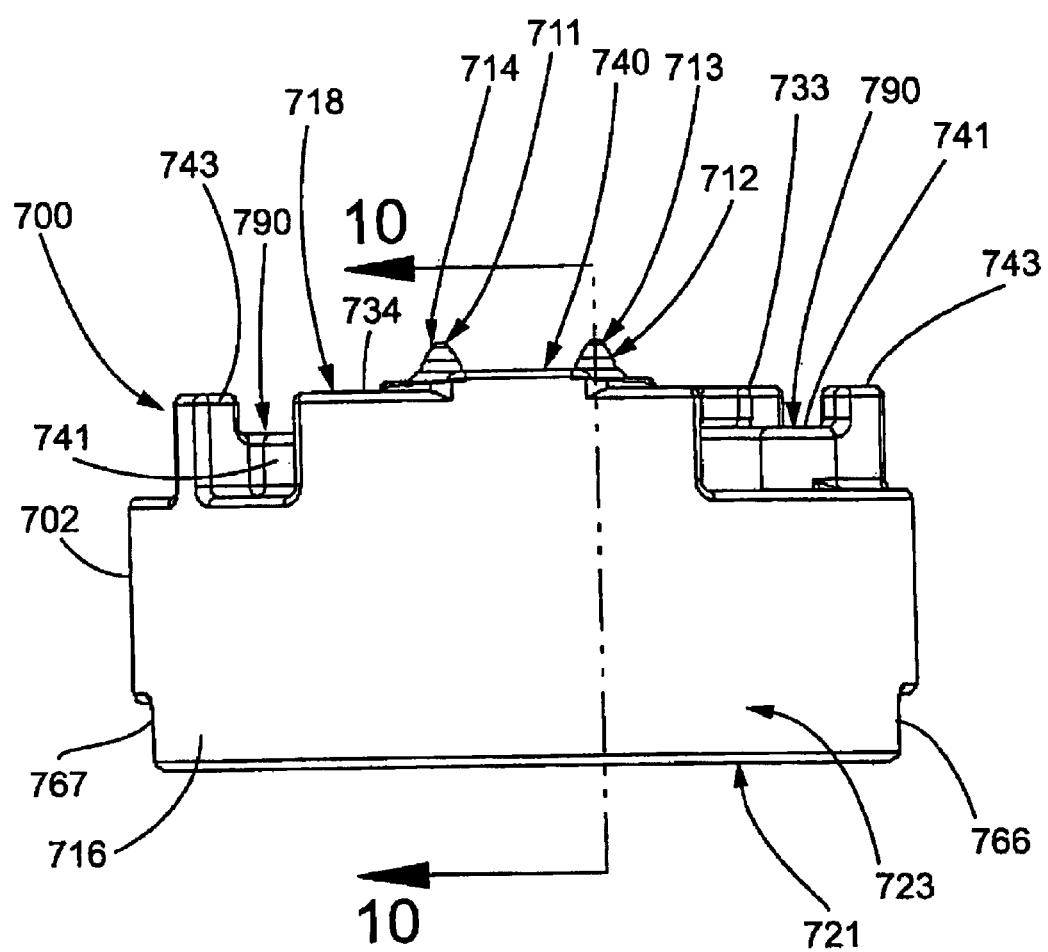
FIG. 9 is a side elevational view of the connector of FIG. 7.

Referring to FIG. 9, each projection 733, 734 includes an intermediate surface 790 adjacent the recess 741 and the post 743. The intermediate surface 790 is substantially parallel to the mating surface 740.

The contact assemblies 711, 712, 713, 714 are similar in construction and function to each other. Only the second contact assembly 712 will be discussed in detail, that description being applicable to the other contact assemblies 711, 713, 714, as well.

Figure 10:
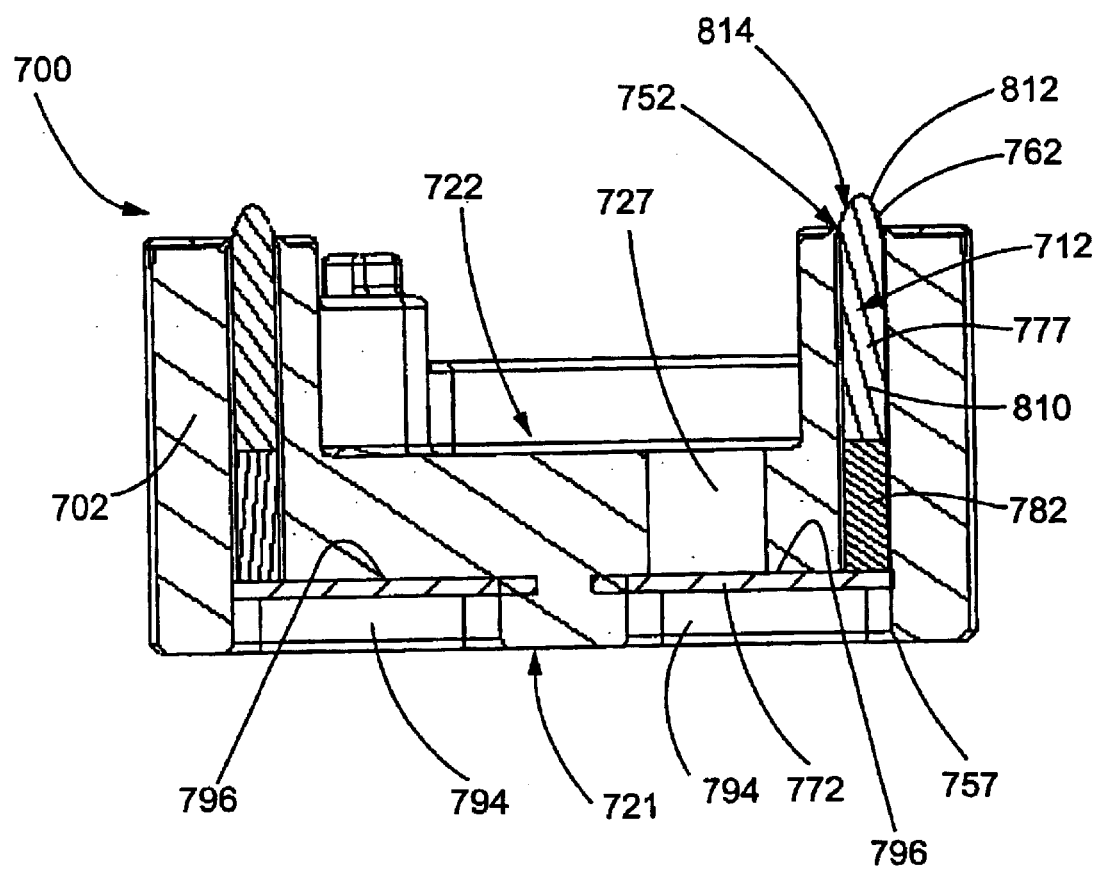
FIG. 10 is a cross-sectional view of the connector of FIG. 7 taken along line 10—10 in FIG. 9.

Referring to FIG. 10, the second contact assembly 712 of the electrical connector 700 includes the contact disc 772, the resilient contact 782, and the reciprocally movable plunger 777. Each cavity of the electrical connector 700 includes a counter bore 794, extending from the first surface 721 of the housing 702 to an end 796. The counter bore 794 of the second cavity 752 communicates with the first opening 757. The contact disc 772 is disposed adjacent the end 796 of the counter bore 794. The contact disc 772 is accessible through the first opening 757 of the second cavity 752. The contact disc 772 is accessible from the second surface 722 of the housing 702 through the second bore 727. The contact disc 772 is generally planar.

The resilient contact 782 is disposed between the contact disc 772 and the plunger 777. The resilient contact 782 is electrically connected to the contact disc 772 and the plunger 777.

The plunger 777 is generally bullet-shaped and includes a base 810 and an end portion 812. The end portion 812 includes a plunger contact surface 814. At least some of the end portion 812 protrudes from the second opening 762 of the second cavity 752. The plunger contact surface 814 is accessible through the second opening 762.

The second contact assembly 712 is similar in other respects to the second contact assembly 112 of the electrical connector 100 shown in FIGS. 1–3.

Referring to FIG. 7, the bores 726, 727, 728, 729 are provided to facilitate the mounting of the contact discs 771, 772, 773, 774 to the housing 702. The bores 726, 727, 728, 729 can be provided as a byproduct of facilitating the respective mounting of the contact discs 771, 772, 773, 774. The contact discs 771, 772, 773, 774 can be insert molded with the housing 702, for example. During the molding process, the contact discs 771, 772, 773, 774 can be disposed in a predetermined vertical position by supports which thereby define the bores 726, 727, 728, 729. Opposing supports can engage the contact discs 771, 772, 773, 774 to cooperatively maintain the discs in the predetermined vertical position with the opposing supports extending through the counter bores 794, as shown in FIG. 8. The contact discs 771, 772, 773, 774 are accessible through the bores 726, 727, 728, 729.

Figure 11:
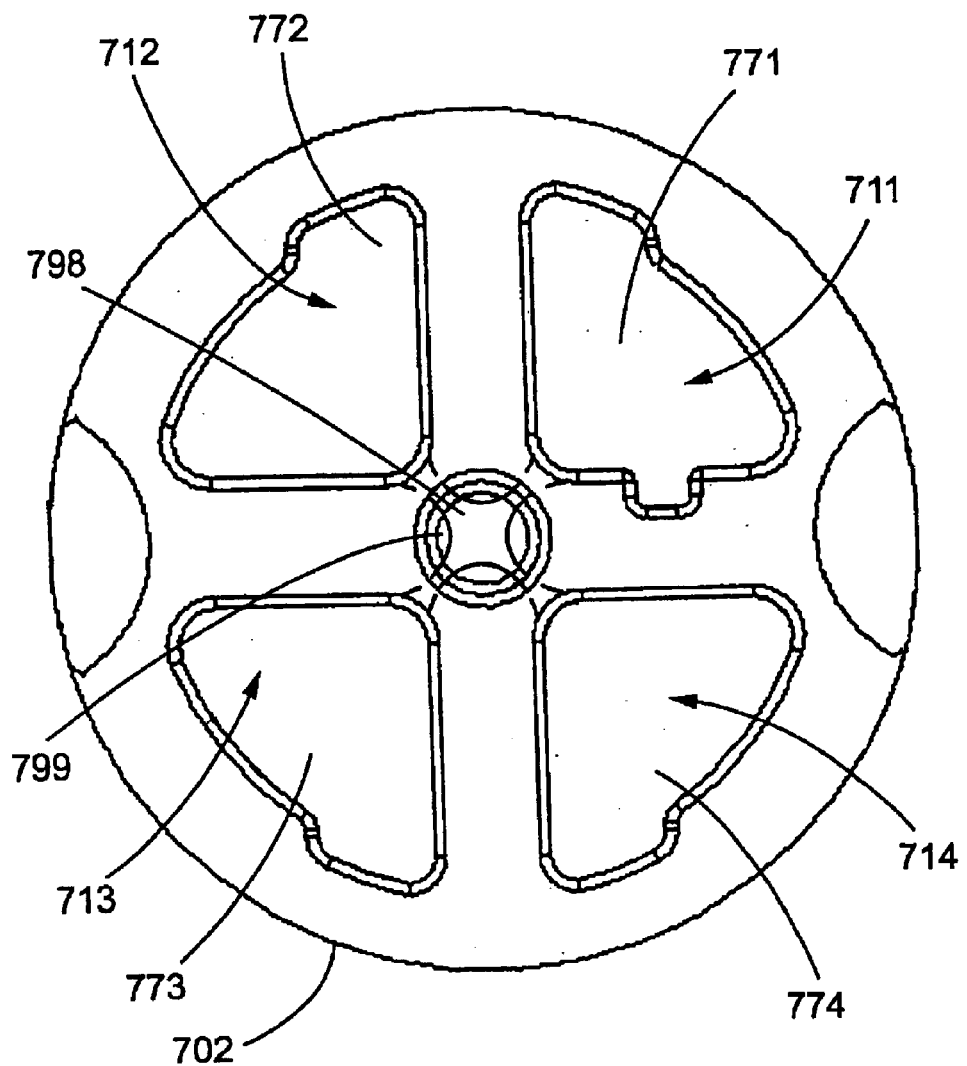
FIG. 11 is a top plan view of the electrical connector of FIG. 7 showing a plurality of contact discs prior to their being separated from each other.

Referring to FIG. 11, the contact discs 771, 772, 773, 774 can be connected together for assembly purposes by a frangible connecting strip 798. The connecting strip 798 is generally X-shaped and is disposed over a central bore 799. To facilitate the mounting of the contact discs 771, 772, 773, 774, the connecting strip 798 can be provided to retain the discs 771, 772, 773, 774 in a predetermined, spaced relationship to each other during an insert molding process to make the housing 702, for example. The connecting strip 798 can be broken in a punching operation, for example, to sever the strip 798, thereby electrically and mechanically separating the contact discs 771, 772, 773, 774. The contact discs 771, 772, 773, 774 may be supported through the respective counterbores 794 during the punching operation. The bore 799 can be defined during a molding process for making the housing 702.

The perforation of the connecting strip 798 can occur while the housing is being molded. In other embodiments, the perforation step can occur after the housing is molded.

The contact assemblies 711, 712, 713, 714 can be mounted to the housing 702 in a manner similar to that described with respect to the contact assemblies 111, 112, 113, 114 of the electrical connector 100 shown in FIGS. 1–3.

Figure 12:
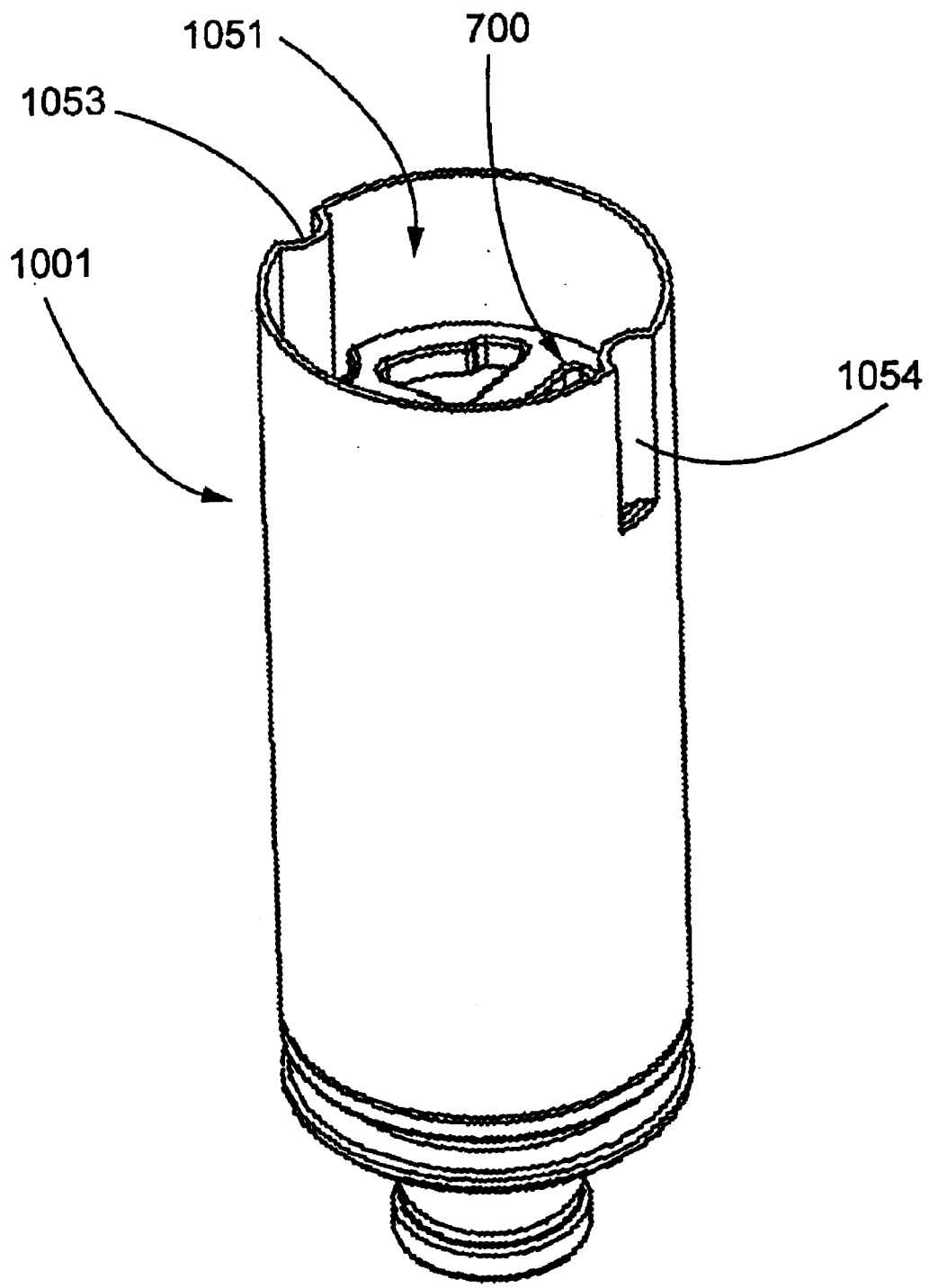
FIG. 12 is a perspective view of a pressure sensor with the connector of FIG. 7 installed therein.
Figure 13:
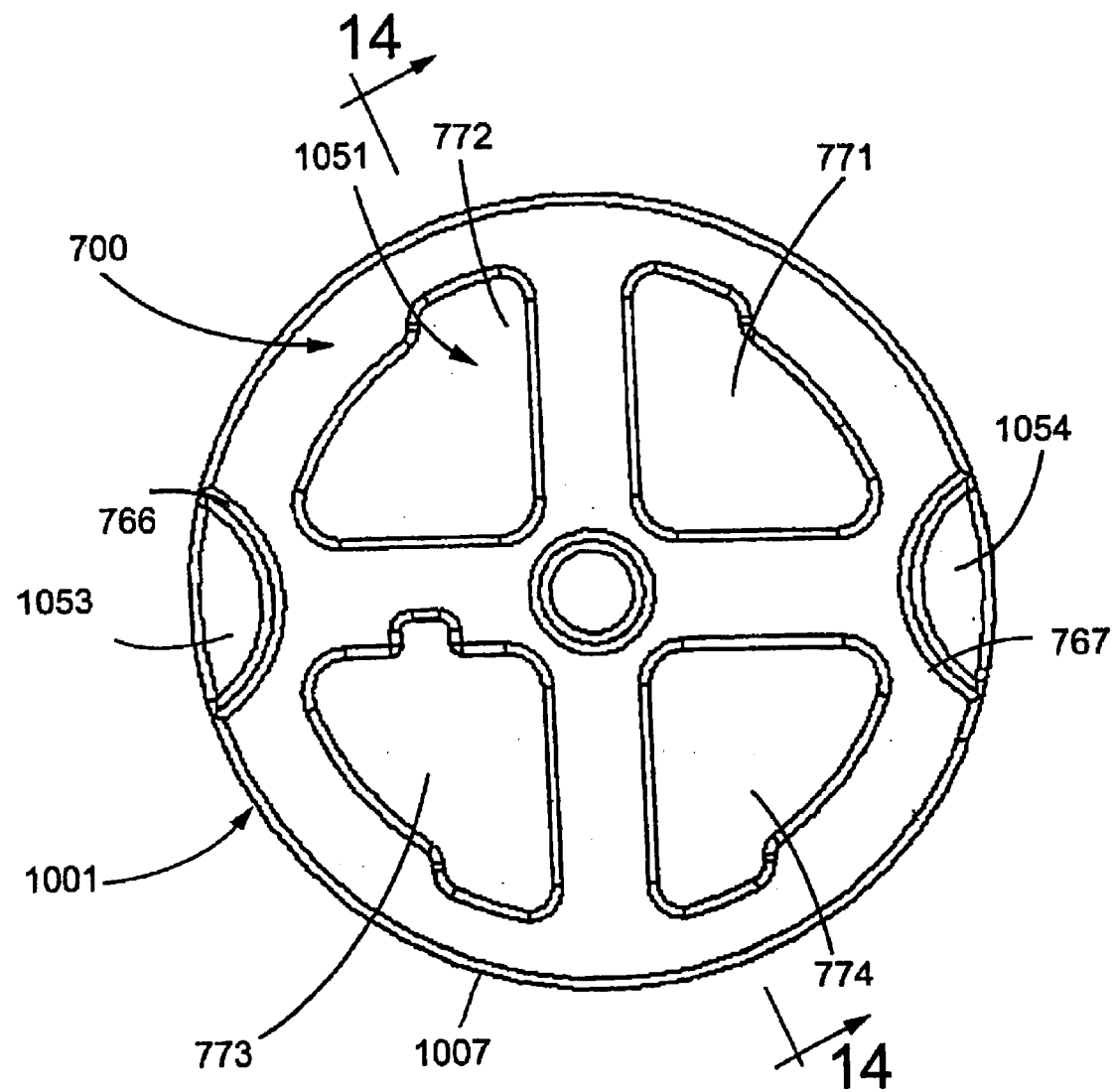
FIG. 13 is a top plan view of the sensor of FIG. 12.
Figure 14:
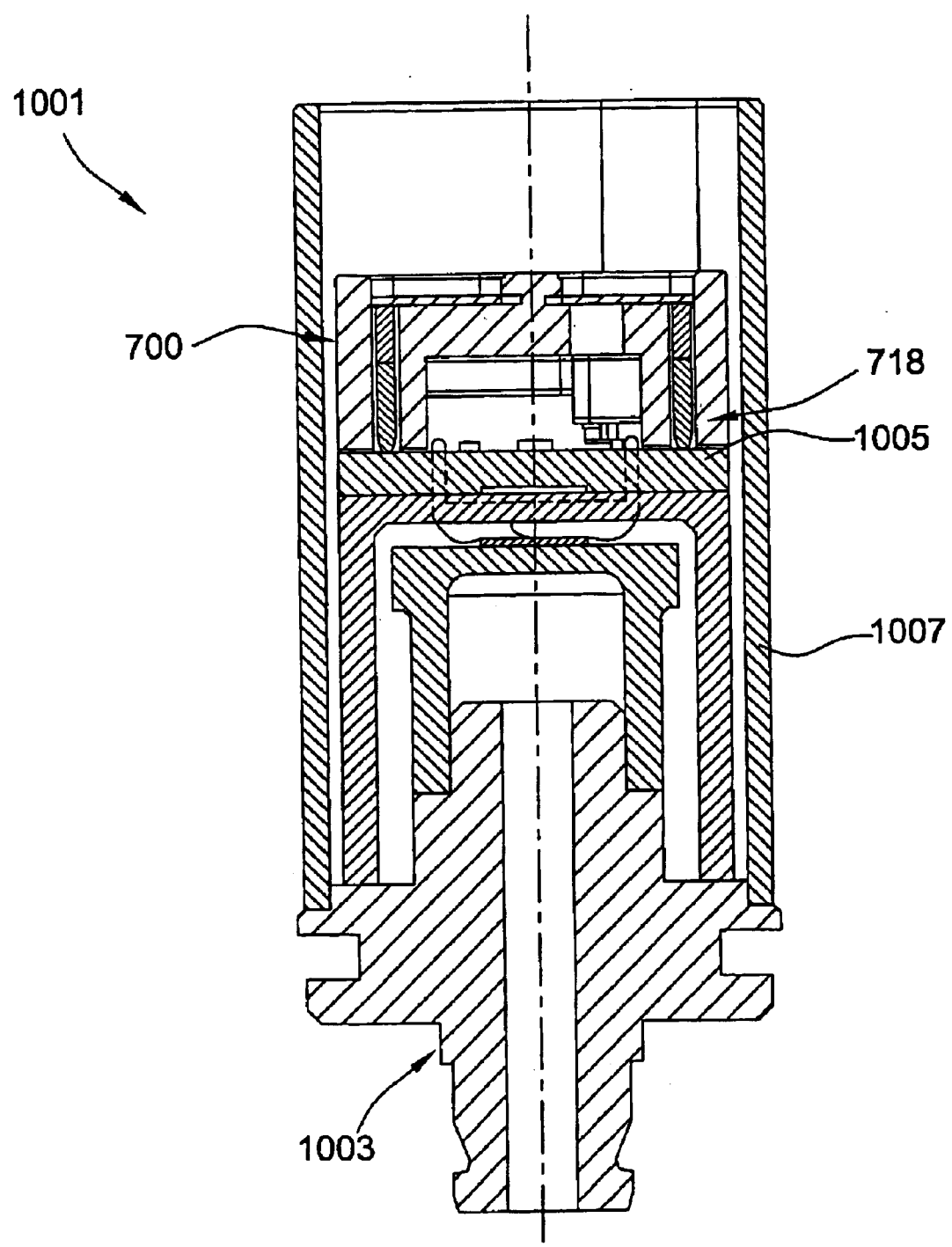
FIG. 14 is a cross-sectional view of the sensor of FIG. 12 taken along line 14—14 in FIG. 13.

Referring to FIGS. 12–14, the electrical connector 700 can be assembled into an electrical device 1001. The electrical device 1001 can be a sensor, such as, a temperature sensor or a pressure sensor, for example. The electrical device 1001 is a pressure sensor. The electrical device 1001 can be used in a de-centralized electronic brake system ("EBS") where the electrical device is disposed in close relation to a brake caliper.

Referring to FIG. 14, the electrical device 1001 includes the electrical connector 700, a pressure input assembly 1003, a printed circuit board 1005, which is disposed between the pressure input assembly 1003 and the electrical connector 700, and a shell 1007. The projecting portion 718 of the electrical connector 700 is adjacent the printed circuit board 1005.

Referring to FIGS. 12 and 13, the shell 1007 defines an open end 1051 and includes a plurality of detents 1053, 1054 extending from the open end 1051 along the surface of the shell 1007. The electrical device 1001 can be mated with another component. Referring to FIG. 13, the open end 1051 of the shell 1007 provides access to the contact discs 771, 772, 773, 774 of the electrical connector 700. The detents 1053, 1054 are provided to retentively engage the other component. The detents 1053, 1054 can facilitate the orientation of a component mating with the electrical device 1001. The detents 1053, 1054 of the shell 1007 can be configured such that they can respectively align with the detents 766, 767 of the electrical connector 700.

The electrical connector 700 and the shell 1007 can be configured to provide a locating feature to facilitate the proper placement of the electrical connector 700 and to aid in mating the electrical connector 700 with another component.

The detents 766, 767 of the electrical connector 700 can be configured to engage the detents 1053, 1054 of the shell 1007 to axially retain the electrical connector 700 in the shell 1007. The engagement of the detents 766, 767 of the electrical connector 700 and the detents 1053, 1054 of the shell 1007 can serve as an indexing feature to orient the electrical connector 700 in a predetermined position.

The detents 1053, 1054 of the shell 1007 can be configured to receive other detents from a mating component and can be configured such that when the detents of the mating component are fully seated thereupon, the mating component is electrically connected to the electrical connector 700.

The electrical device 1001 of FIGS. 12–14 is similar in construction and function in other respects to the electrical device 401 of FIGS. 4–6.

Figure 15:
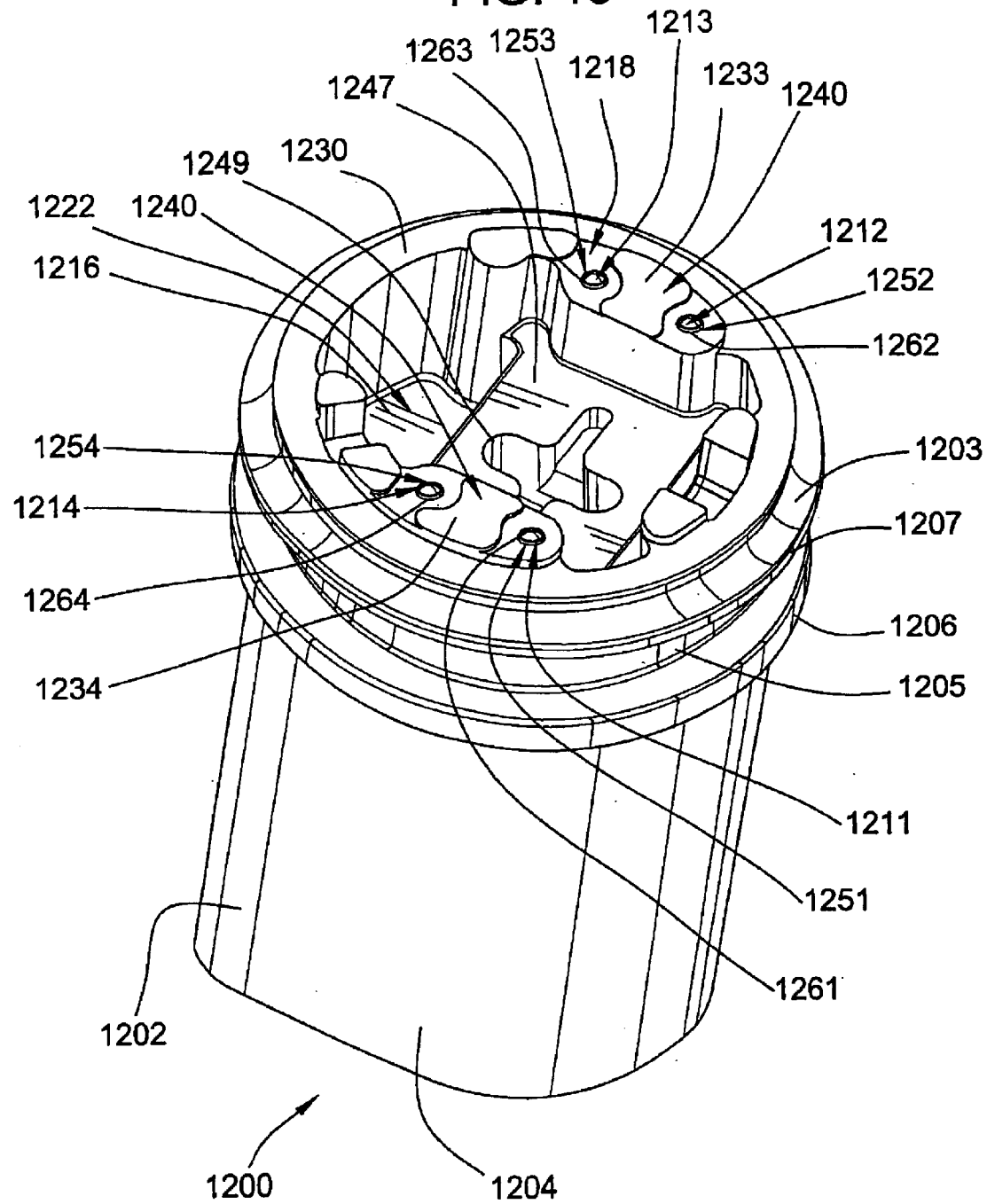
FIG. 15 is a bottom perspective view of another embodiment of an electrical connector in accordance with the present invention.
Figure 16:
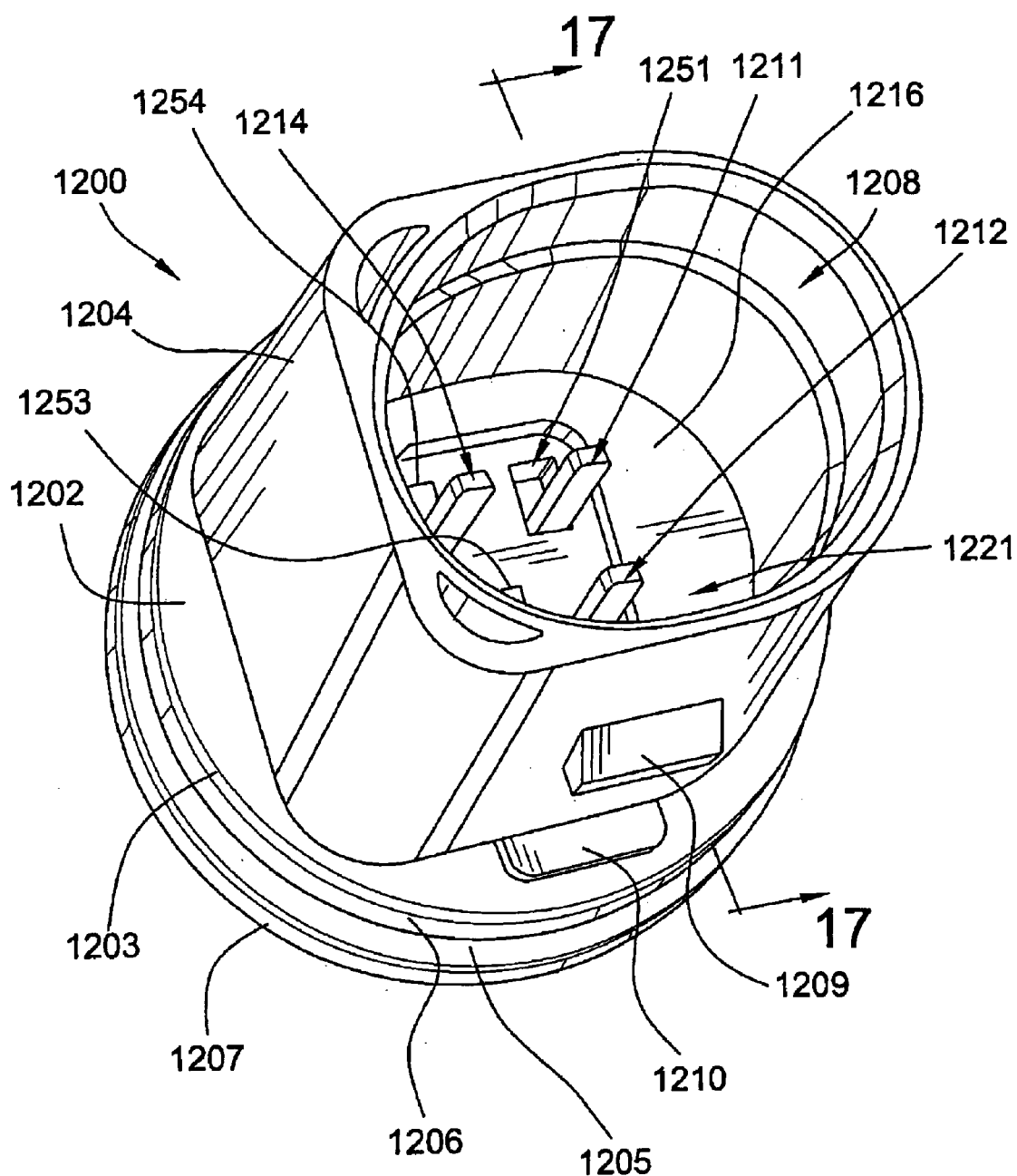
FIG. 16 is a top perspective view of the electrical connector of FIG. 15.
Figure 17:
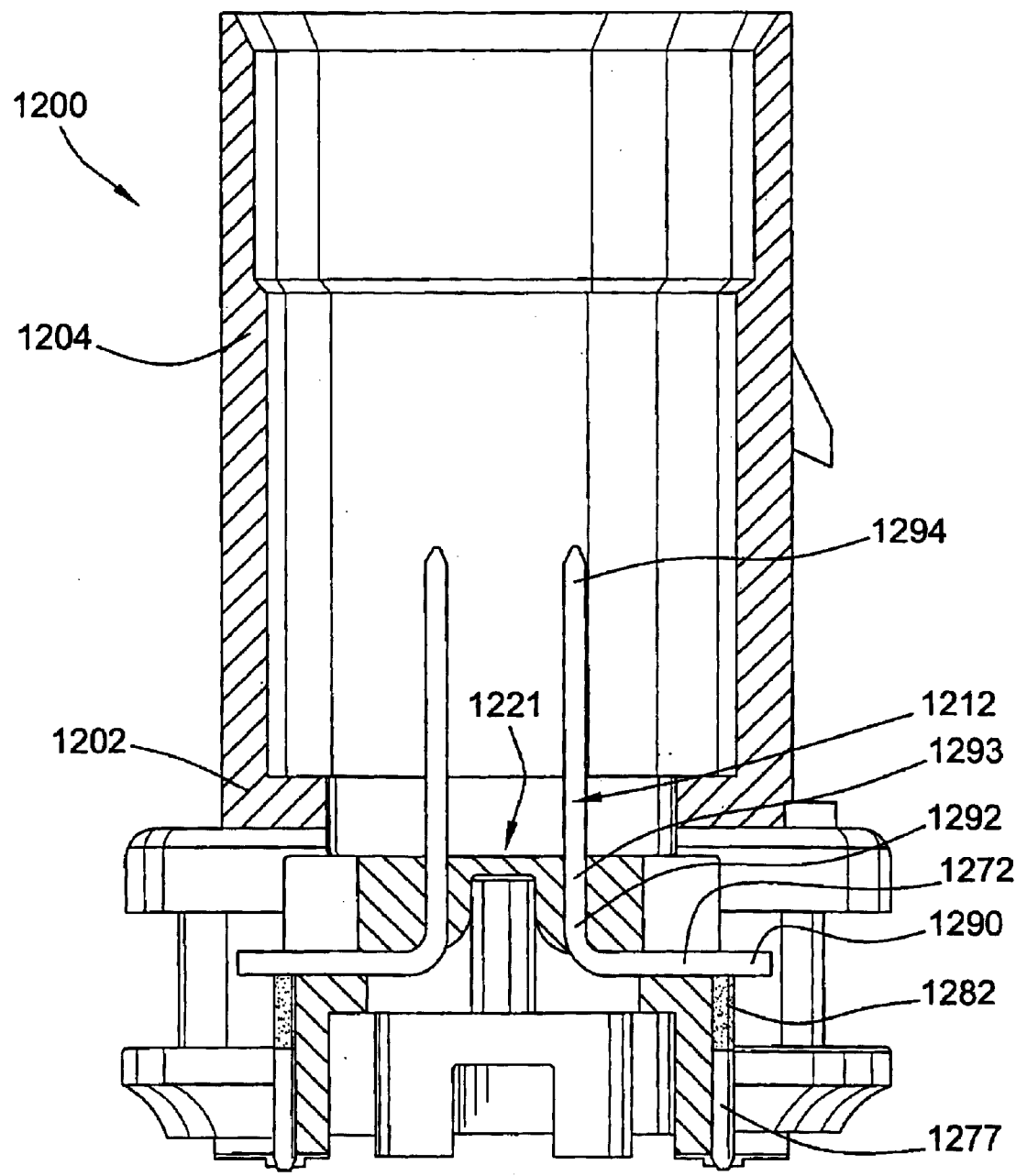
FIG. 17 is a cross-sectional view of the electrical connector of FIG. 15 taken along line 17—17 in FIG. 16.

Referring to FIGS. 15–17, another embodiment of an electrical connector 1200 according to the present invention is shown. The electrical connector 1200 can be used in a sensor, for example. In one illustrative application, the electrical connector 1200 can be used in a "centralized" EBS, i.e., the electrical connector 1200 is disposed in an engine compartment of a vehicle.

Referring to FIGS. 15 and 16, the connector 1200 includes a housing 1202 and a plurality of axially resilient electrical contact assemblies 1211, 1212, 1213, 1214. The contact assemblies 1211, 1212, 1213, 1214 are mounted to the housing 1202. The contact assemblies 1211, 1212, 1213, 1214 are electrically conductive and are resilient such that the assemblies can be compressively engaged to exert a responsive contact pressure. The housing 1202 can act as an electrical insulator. For example, the housing 1202 can act to maintain the contact assemblies in electrical isolation from each other.

The housing 1202 includes a collar 1203 and a shroud 1204 extending therefrom. The collar 1203 includes an annular groove 1205 and first and second shoulders 1206, 1207. The shroud 1204 is generally hollow and includes an open end 1208, a chamfered locking tab 1209, and a raised segment 1210. The shroud 1204 is provided to define a substantially sealed enclosure when the electrical-connector 1200 is engaged with a mating component. The contact assemblies 1211, 1212, 1213, 1214 are accessible through the open end 1208 of the shroud 1204. The locking tab 1209 can be used to retentively engage a mating component.

The housing 1202 includes a body portion 1216 and a projecting portion 1218. The body portion 1216 includes a first surface 1221 and a second surface 1222.

Referring to FIG. 15, the projecting portion 1218 projects from the second surface 1222 of the body portion 1216. The projecting portion 1218 includes an annular ring 1230 and a first and a second projection 1233, 1234. The ring 1230 is disposed on the outer circumference of the body portion 1216.

The projections 1233, 1234 extend from the ring 1230 and the body portion 1216. The projections 1233, 1234 oppose each other and are similar to each other. Each projection 1233, 1234 includes a mating surface 1240. The second and third contact assemblies 1212, 1213 are disposed in the first projection 1233. The first and fourth contact assemblies 1211, 1214 are disposed in the second projection 1234.

Referring to FIGS. 15 and 16, the housing 1202 includes a cavity 1251, 1252, 1253, 1254 for each respective contact assembly 1211, 1212, 1213, 1214. Referring to FIG. 15, the second and third cavities 1252, 1253 include a respective second opening 1262, 1263, which communicates with the mating surface 1240 of the first projection 1233. The first and fourth cavities 1251, 1254 include a respective second opening 1261, 1264, which communicates with the mating surface 1240 of the second projection 1234. The contact assemblies 1211, 1212, 1213, 1214 are retentively engaged with the housing 1202 and are disposed in the cavities 1251, 1252, 1253, 1254, respectively.

Referring to FIG. 15, the second surface 1222 defines an interior relieved portion 1247 with a generally cruciate-shaped passage 1249. The passage 1249 can be provided to reduce the amount of material used to make the housing 1202 and to facilitate the manufacture thereof. The passage 1249 can act to reduce the likelihood of sink marks appearing during the cooling of the housing 1202 after it is molded, for example.

The housing 1202 of the electrical connector 1200 in FIGS. 15–17 is similar in construction and function in other respects to the housing 702 of the electrical connector 700 in FIGS. 7–11.

Referring to FIG. 15, the contact assemblies 1211, 1212, 1213, 1214 are similar in construction and function to each other. Only the second contact assembly 1212 will be discussed in detail, that description being applicable to the other contact assemblies 1211, 1213, 1214, as well.

Referring to FIG. 17, the second contact assembly 1212 includes a contact disc 1272, a resilient contact 1282, and a reciprocally movable plunger 1277. The contact disc 1272 is electrically conductive and includes a generally planar body portion 1290, a tab portion 1292 that extends from the body portion 1290, and a blade portion 1293 that extends from the tab portion 1292. The body portion 1290 is generally planar. The tab portion 1292 is disposed at about a 90° angle with respect to the body portion 1290. The blade portion 1293 is substantially parallel to the tab portion 1292. An end 1294 of the blade portion 1293 extends from the first surface 1221 of the housing 1202. The end 1294 is disposed within the shroud 1204.

The second contact assembly 1212 is similar in other respects to the second contact assembly 712 of the electrical connector 700 shown in FIGS. 7–11. The electrical device 1200 of FIGS. 15–17 is similar in other respects to the electrical device 700 shown in FIGS. 7–11.

Figure 18:
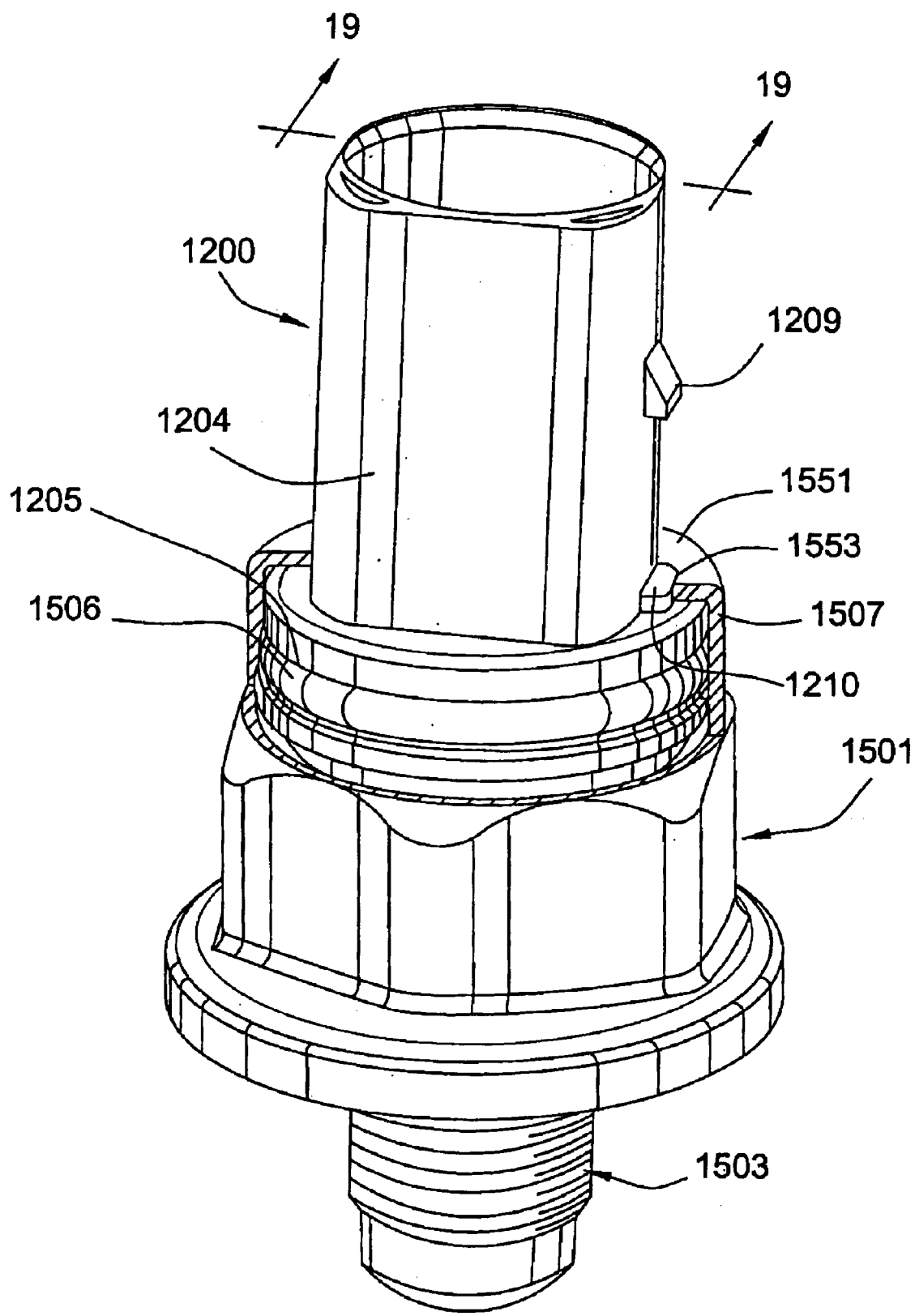
FIG. 18 is a partially broken away, perspective view of another embodiment of a sensor with the connector of FIG. 15 installed therein.
Figure 19:
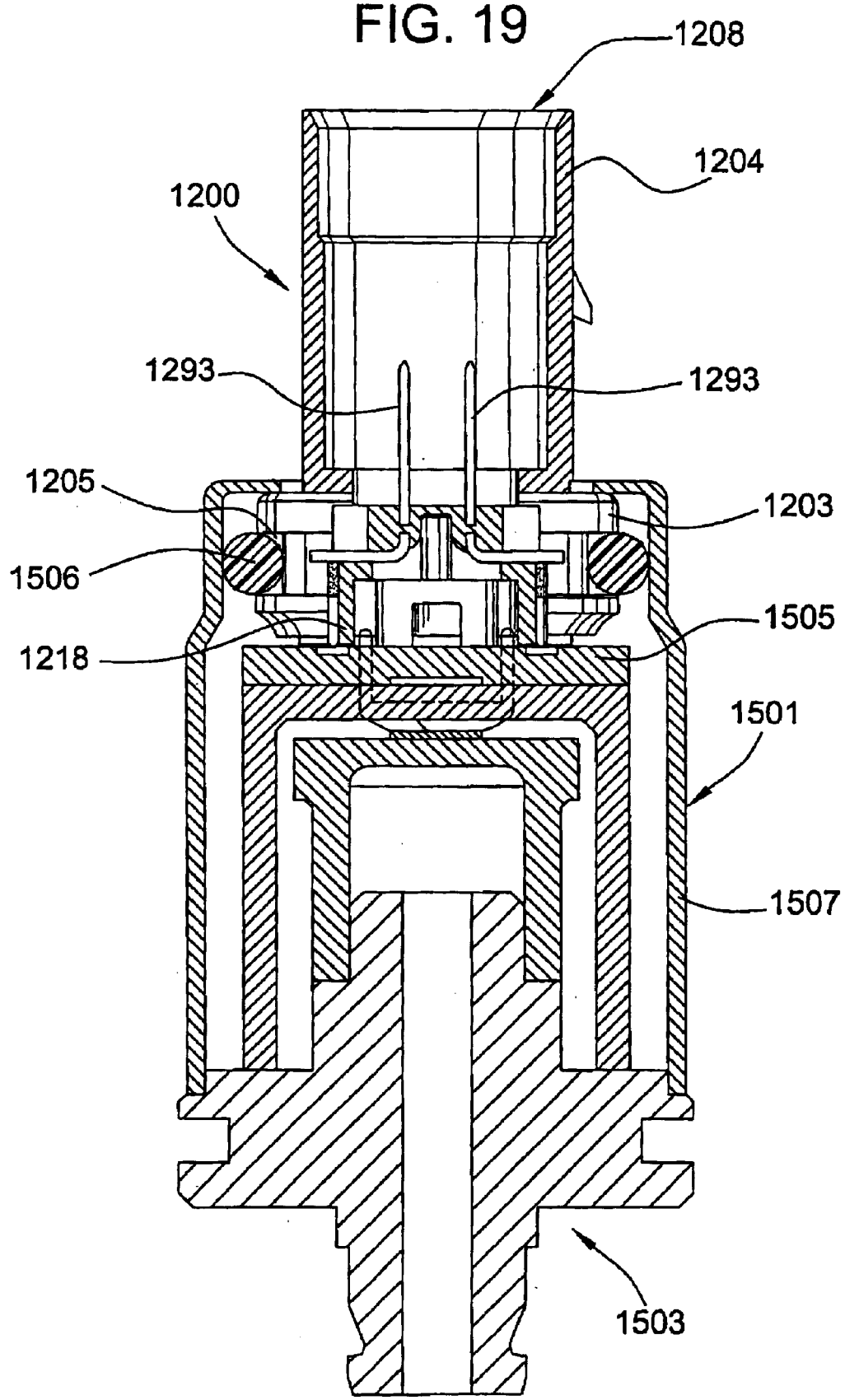
FIG. 19 is a cross-sectional view of the sensor of FIG. 18 taken along line 19—19 in FIG. 18.

Referring to FIGS. 18 and 19, the electrical connector 1200 can be assembled into an electrical device 1501, such as, a temperature sensor or a pressure sensor, for example. The illustrative electrical device 1501 is a pressure sensor. The electrical device 1501 can be used in a centralized electronic brake system ("EBS") where the electrical device is disposed in an engine compartment of a vehicle. In such an EBS application, the electrical device 1501 can be electrically connected to a brake caliper hydraulic activator via a wire harness.

Referring to FIG. 19, the electrical device 1501 includes the electrical connector 1200, a pressure input assembly 1503, a printed circuit board 1505 disposed between the pressure input assembly 1503 and the electrical connector 1200, an O-ring seal 1506 disposed about the annular groove 1205 of the electrical connector 1200, and a shell 1507.

The pressure input assembly 1503 is adjacent the printed circuit board 1505. The collar 1203 and a projecting portion 1218 of the electrical connector 1200 are adjacent the printed circuit board 1505. The seal 1506 is engaged with the shell 1507 and the electrical connector 1200 to provide a fluid seal therebetween.

Referring to FIG. 18, the shell 1507 includes an end 1551 having an opening 1553 therethrough. The shroud 1204 extends through the opening 1553 of the shell 1507. The shroud 1204 is configured to substantially fully occupy the opening 1553. The raised segment 1210 of the electrical connector 1200 is engaged with the opening 1553. The raised segment 1210 and the opening 1553 cooperate together to retain the electrical connector 1200 and to provide a keying feature which can help ensure that the connector 1200 is in a desired position with respect to the shell 1507. The chamfered locking tab 1209 can retentively engage a mating component. Referring to FIG. 19, the blades 1293 of the electrical connector 1200 are accessible through the open end 1208 of the shroud 1204 for electrical connection with the mating component.

The electrical device 1501 of FIGS. 18 and 19 is similar in other respects to the electrical device 401 shown in FIGS. 4–6.

Figure 20:
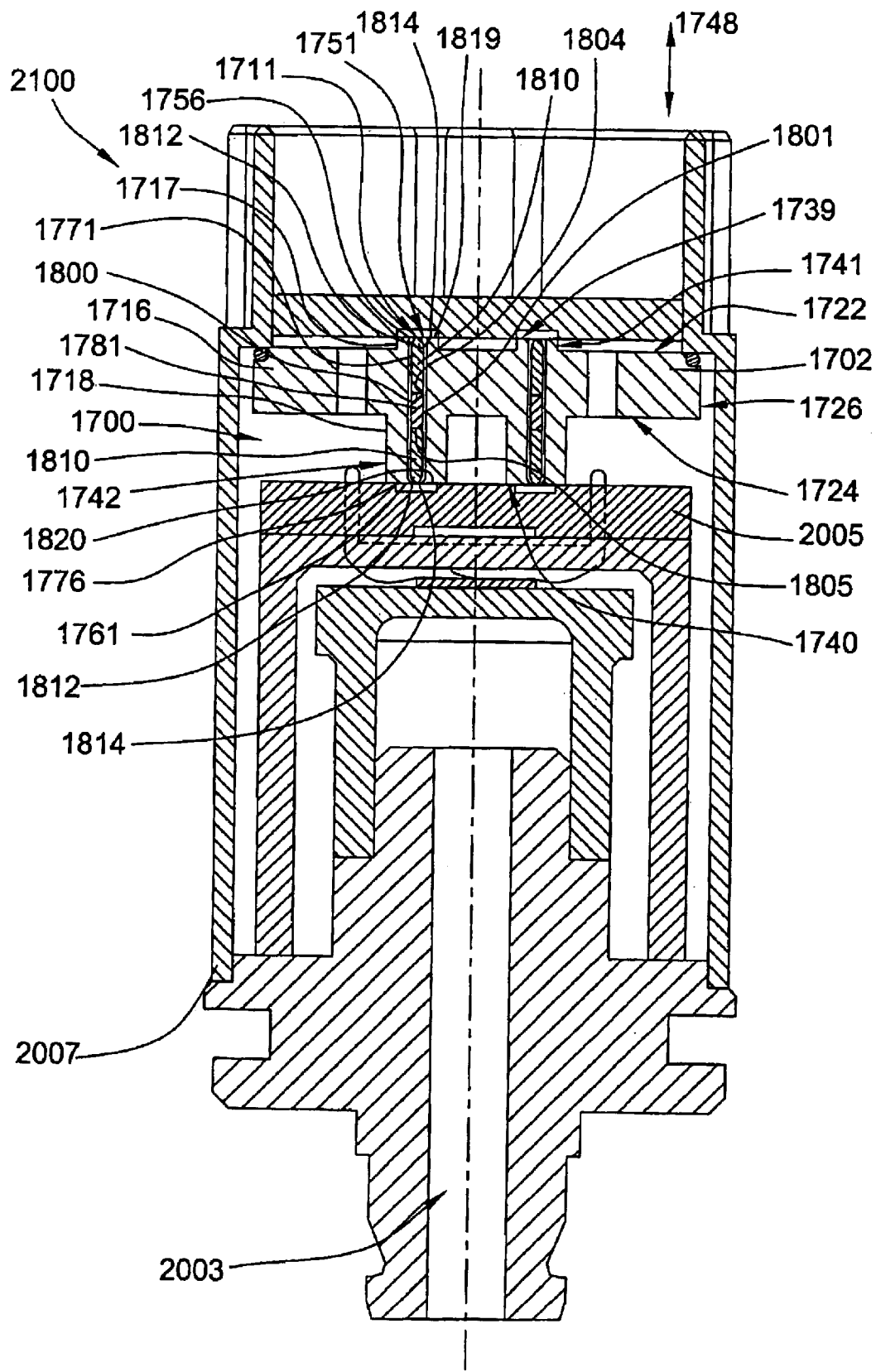
FIG. 20 is a cross-sectional view of another embodiment of an electrical connector according to the present invention installed in another embodiment of a sensor.

Referring to FIG. 20, another embodiment of an electrical connector 1700 according to the present invention can be assembled into an electrical device 2001. The illustrative electrical device 2001 is a pressure sensor. The electrical device 2001 includes the electrical connector 1700, a pressure input assembly 2003, a printed circuit board 2005, which is disposed between the pressure input assembly 2003 and the electrical connector 1700, and a shell 2007.

The electrical connector 1700 includes a housing 1702 and four contact assemblies. The housing 1702 includes a body portion 1716 and first and second projecting portions 1717, 1718. The body portion 1716 includes a first surface 1722, a second surface 1724, and a peripheral surface 1726 therebetween. The peripheral surface 1726 defines the outer circumference of the housing 1702.

Referring to FIG. 20, the first projecting portion 1717 projects from the first surface 1722 of the body portion 1716. The first projecting portion 1717 includes a mating surface 1739 and a perimeter surface 1741. The perimeter surface 1741 is bounded by the mating surface 1739 and the first surface 1722 of the body portion 1716.

The second projecting portion 1718 projects from the second surface 1724 of the body portion 1716. The second projecting portion 1718 includes a mating surface 1740 and a perimeter surface 1742. The perimeter surface 1742 is bounded by the mating surface 1740 and the second surface 1724 of the body portion 1716. The second projecting portion 1718 of the electrical connector 1700 is adjacent the printed circuit board 2005.

The contact assemblies of the electrical connector 1700 are similar to each other and only the first contact assembly 1711 will be discussed in detail. The description of the first contact assembly 1711 is applicable to the other three contact assemblies, as well.

The first contact assembly 1711 is disposed in a first cavity 1751 and includes first and second reciprocally movable plungers 1771, 1776 and a resilient contact 1781 disposed therebetween.

The resilient contact 1781 is resiliently flexible. The resilient contact 1781 may comprise a resiliently wadded conductor, typically in the form of an elongated cylindrical contact element comprising a resiliently and randomly wadded single thin gauge electrically conductive wire. The resilient contact 1781 includes first and second ends 1800, 1801 that respectively define first and second contact surfaces 1804, 1805. The first contact surface 1804 is electrically engaged with the first plunger 1771. The second contact surface 1805 is electrically engaged with the second plunger 1776.

Each plunger 1771, 1776 includes a base 1810 and an end portion 1812. The base 1810 is cylindrical. The end portion 1812 tapers to a rounded plunger contact surface 1814, thereby imparting the plungers 1771, 1776 with a "bullet" shape. The plunger contact surface 1814 of the first plunger 1771 is accessible through a first opening 1756 of the first cavity 1751. The size of the base 1810 of the first plunger 1771 is configured such that it cannot pass through the first opening 1756. The plunger contact surface 1814 of the second plunger 1776 is accessible through a second opening 1761 of the first cavity 1751. The size of the base 1810 of the second plunger 1776 is configured such that it cannot pass through the second opening 1761.

The plungers 1771, 1776 and the resilient contact 1781 are sufficiently freely movable axially of the first cavity 1751 such that the resilient contact 1781 maintains contact with the adjacent surfaces of the plungers 1771, 1776 while permitting and providing respective, resilient axial movement of the plungers 1771, 1776 within the ambit of axial movement corresponding generally to the length of the projecting part of the respective end portions 1812.

To mount the first contact assembly 1711 in the housing 1702, areas 1819, 1820 of the first and second projecting portions 1717, 1718 of the housing 2702, respectively, adjacent the first cavity 1751 can be modified, as by cold-form staking inwardly, to reduce the size of the first and second openings 1756, 1761 of the first cavity 1751, thereby retaining the bases 1810 of the first and second plungers 1771, 1776 in the first cavity 1751 while permitting free passage of the end portions 1812, as illustrated in FIG. 20.

The electrical connector 1700 of FIG. 20 is similar in other respects to the electrical connector 100 shown in FIGS. 1–3. The electrical device 2001 of FIG. 20 is similar in other respects to the electrical device 401 shown in FIGS. 4–6.

Figure 21:
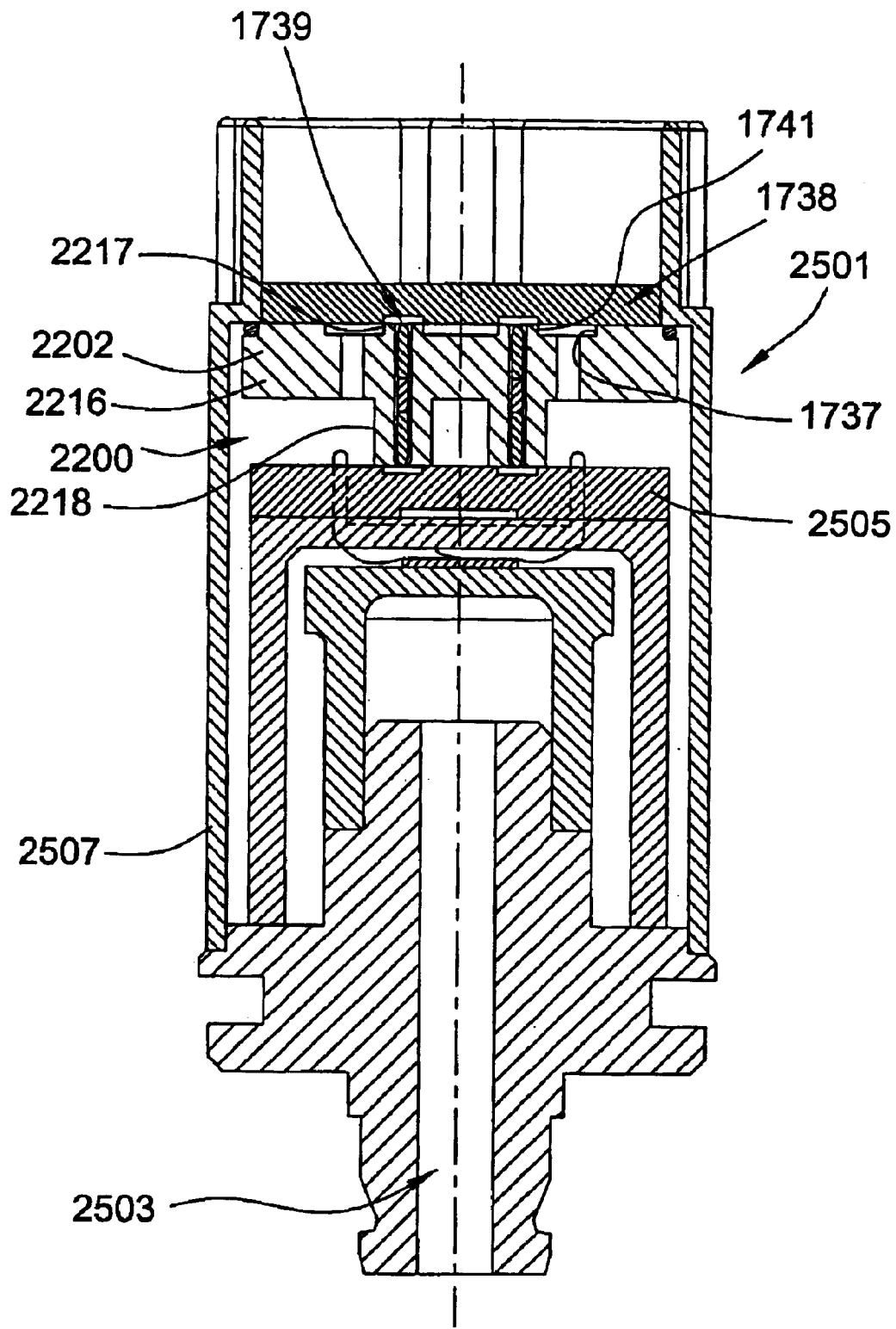
FIG. 21 is a cross-sectional view of another embodiment of an electrical connector according to the present invention installed in another embodiment of a sensor.

Referring to FIG. 21, another embodiment of an electrical connector 2200 according to the present invention can be assembled into an electrical device 2501. The illustrative electrical device 2501 is a pressure sensor. The electrical device 2501 includes the electrical connector 2200, a pressure input assembly 2503, a printed circuit board 2505, which is disposed between the pressure input assembly 2503 and the electrical connector 2200, and a shell 2507.

The electrical connector 2200 includes a housing 2202 having a body portion 2216 and first and second projecting portions 2217, 2218. The first projecting portion 1717 includes an annular ring 1737, a mating surface 1739 and a perimeter surface 1741. The annular ring 1737 has an end surface 1738 that is substantially flush with the mating surface 1739.

The electrical connector 2200 of FIG. 21 is similar in other respects to the electrical connector 1700 shown in FIG. 20. The electrical device 2501 of FIG. 21 is similar in other respects to the electrical device 2001 shown in FIG. 20.

Figure 22:
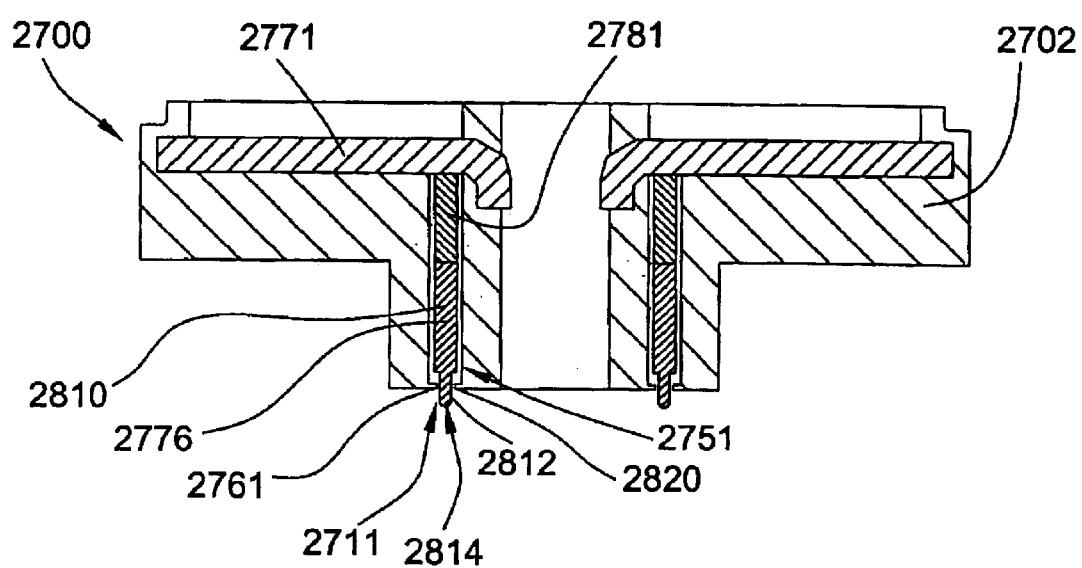
FIG. 22 is a cross-sectional view of another embodiment of an electrical connector according to the present invention.

FIG. 22 illustrates another embodiment of an electrical connector 2700 which includes a housing 2702 and a plurality of contact assemblies. A first contact assembly 2711 includes a contact disc 2771, a resilient contact 2781, and a reciprocally movable plunger 2776. The electrical connector 2700 of FIG. 22 is the same as the electrical connector 100 shown in FIGS. 1–3 except that the plunger 2776 in FIG. 22 is different than the plunger 176 shown in FIGS. 1–3.

The plunger 2776 includes a base 2810 and an end portion 2812. The base 2810 is cylindrical and has a first diameter. The end portion 2812 is cylindrical and has a second diameter. The second diameter of the end portion 2812 is smaller than the first diameter of the base 2810. At least some of the end portion 2812 protrudes from a second opening 2761 of a first cavity 2751 of the housing 2702. A plunger contact surface 2814 is accessible through the second opening 2761 of the first cavity 2751. The size of the first diameter of the base 2810 is configured such that it cannot pass through the second opening 2761.

The contact assembly can have different configurations in other embodiments. U.S. Pat. Nos. 4,988,306, 5,127,837, 5,382,169, and 5,704,795 further illustrate and describe contact assemblies using similar and other combinations of resilient contacts and reciprocal plungers, and those references are incorporated herein by this reference in their entireties.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Of course, variations of those preferred embodiments will become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An electrical connector comprising:
   an insulative housing, the housing including a cavity having first and second openings; and
   an axially resilient contact assembly, the contact assembly being resilient such that the contact assembly can be compressively engaged to exert a responsive contact pressure, the contact assembly mounted to the housing and disposed in the cavity, the contact assembly including a resilient contact and a contact disc, the contact disc being accessible through one of the openings of the cavity, the contact assembly includes a reciprocally movable plunger, the resilient contact being disposed between the contact disc and the plunger.

2. The electrical connector of claim 1 wherein the contact disc includes a body portion and a tab, the body portion being generally planar and being accessible through the first opening of the cavity, and the tab being disposed at an oblique angle with respect to the body portion.

3. The electrical connector of claim 1 wherein the contact disc of the contact assembly is integrally mounted to the housing by insert molding.

4. The electrical connector of claim 1 wherein the cavity includes a counterbore having an end, the counterbore communicating with the first opening, the contact disc being disposed adjacent the end of the counterbore.

5. The electrical connector of claim 1 wherein the housing includes a bore, the contact disc being accessible from through the bore.

6. The electrical connector of claim 1 wherein the housing includes a pair of cavities, and further comprising a pair of contact assemblies, the contact assemblies each including a contact disc, the contact assemblies being mounted to the housing and disposed in the respective cavities, the contact discs being connected together by a frangible connecting strip while being mounted to the housing.

7. The electrical connector of claim 1 wherein the resilient contact is a resiliently wadded conductor comprising a resiliently and randomly wadded single thin gauge electrically conductive wire.

8. The electrical connector of claim 1 wherein the contact disc is accessible through the first opening of the cavity, and the plunger is accessible through the second opening of the cavity.

9. The electrical connector of claim 1 wherein the plunger is generally bullet-shaped.

10. The electrical connector of claim 1 wherein the plunger is generally T-shaped.

11. The electrical connector of claim 1 wherein the plunger includes an end portion and wherein the resilient contact and the plunger are mounted to the housing by insertion into the second opening of the cavity and an area of the projecting portion adjacent the second opening of the cavity being modified to reduce the size of the second opening to thereby retain the resilient contact and the plunger in the cavity while permitting free passage of the end portion of the plunger.

12. The electrical connector of claim 1 wherein the housing includes a detent.

13. The electrical connector of claim 1 wherein the resilient contact is an elastomeric contact.

14. The electrical connector of claim 1 wherein the contact disc includes a body portion and a blade portion extending therefrom, the blade including an end that extends from the housing.

15. The electrical connector of claim 14 wherein the housing includes a shroud, and the end of the blade portion being disposed within the shroud.

16. The electrical connector of claim 1 wherein the plunger includes a base and an end portion.

17. The electrical connector of claim 16 wherein the plunger includes a base and an end portion, the base being generally cylindrical, and the end portion being generally conical.

18. The electrical connector of claim 16 wherein the base has a first diameter and the end portion has a second diameter, the first diameter being greater than the second diameter.

19. The electrical connector of claim 16 wherein the end portion of the plunger is accessible through the second opening of the cavity.

20. The electrical connector of claim 16 wherein the second opening of the second cavity has a reduced size as a result of cold-forming to thereby retain the base of the plunger in the cavity while permitting free passage of the end portion of the plunger through the second opening.

21. The electrical connector of claim 1 wherein the housing includes a plurality of cavities and further comprising a plurality of contact assemblies corresponding to the plurality of cavities, the contact assemblies being mounted to the housing and disposed in the respective cavities.

22. The electrical connector of claim 21 wherein the cavities each include first openings, and the first opening of one of the cavities includes a flag portion and the first openings of the other cavities do not.

23. The electrical connector of claim 1 wherein the housing includes a body portion and a projecting portion.

24. The electrical connector of claim 23 wherein the projecting portion includes an annular ring.

25. The electrical connector of claim 23 wherein the body portion includes a first surface, a second surface, and a peripheral surface, and the peripheral surface being disposed between the first surface and the second surface.

26. The electrical connector of claim 25 wherein the projecting portion projects from the second surface of the body portion.

27. The electrical connector of claim 25 wherein the projecting portion includes a mating surface and a perimeter surface, the perimeter surface being bounded by the mating surface and the second surface of the body portion.

28. The electrical connector of claim 27 wherein the first opening of the cavity communicates with the first surface of the body portion and the second opening of the cavity communicates with the mating surface of the projecting portion.

29. The electrical connector of claim 23 wherein the projecting portion is generally cruciate-shaped.

30. The electrical connector of claim 29 wherein the projecting portion includes a centrally-disposed bore and a plurality of segments extend from the bore.

31. The electrical connector of claim 23 wherein the projecting portion includes a first projection and a second projection.

32. The electrical connector of claim 31 wherein the projecting portion includes an annular ring.

33. The electrical connector of claim 31 wherein each of the projections includes a mating surface, a recess, and a post.

34. The electrical connector of claim 33 wherein each of the projections includes an intermediate surface adjacent the recess and the post.

35. The electrical connector of claim 31 wherein the housing includes a pair of cavities, the first projection including one cavity and the second projection including the other cavity, and further comprising a pair of contact assemblies, the contact assemblies being mounted to the housing and disposed in the respective cavities.

36. The electrical device of claim 23 wherein the housing includes a second projecting portion, the body portion includes a first surface and a second surface, the first projecting portion projecting from the first surface of the body portion, and the second projecting portion projecting from the second surface of the body portion.

37. The electrical device of claim 36 wherein the first projecting portion includes an annular ring.

38. The electrical connector of claim 1 wherein the housing includes a collar.

39. The electrical connector of claim 38 wherein the collar includes an annular groove.

40. The electrical connector of claim 39 wherein the electrical connector further comprises an O-ring seal disposed about the annular groove.

41. The electrical connector of claim 1 wherein the housing includes a shroud.

42. The electrical connector of claim 41 wherein the shroud includes an open end and a chamfered locking tab.

43. The electrical connector of claim 42 wherein the shroud includes a raised segment.

44. The electrical connector of claim 1 in a sensor, the sensor including a shell and a printed circuit board disposed in the shell, the printed circuit board including a contact pad, the contact assembly compressively engaged with the printed circuit board, and the contact assembly electrically connected to the contact pad of the printed circuit board.

45. The electrical connector of claim 44 wherein the sensor is a pressure sensor.

46. The electrical device of claim 45 wherein the pressure sensor is for a decentralized electronic brake system.

47. The electrical device of claim 45 wherein the pressure sensor is for a centralized electronic brake system.

48. A sensor comprising:

a shell;

a printed circuit board disposed in the shell, the printed circuit board including a contact pad; and an electrical connector, the electrical connector disposed in the shell, the electrical connector including a housing and an axially resilient contact assembly, the housing having a cavity with first and second openings, the contact assembly mounted to the housing and disposed in the cavity, the contact assembly having a resilient contact, the contact assembly accessible through one of the first and the second openings, the contact assembly compressively engaged with the printed circuit board, and the contact assembly electrically connected to the contact pad of the printed circuit board.

49. The electrical device of claim 48 wherein the printed circuit board includes a plurality of contact pads, the housing of the electrical connector includes a plurality of cavities, the electrical connector including a plurality of contact assemblies corresponding to the plurality of cavities, the contact assemblies mounted to the housing and disposed in the respective cavities, the contact assemblies of the electrical connector being respectively electrically connected to the contact pads.

50. The electrical device of claim 48 wherein the housing includes an annular groove, the electrical device further comprises an O-ring seal disposed about the annular groove, the O-ring seal engaged with the shell and the electrical connector to provide a fluid seal therebetween.

51. The electrical device of claim 48 wherein the contact assembly is engageable with a helical spring contact disposed in an electrical component.

52. The electrical device of claim 48 wherein the contact assembly includes a plunger.

53. The electrical device of claim 48 wherein the sensor is a pressure sensor.

54. The electrical device of claim 53 wherein the pressure sensor is for a decentralized electronic brake system.

55. The electrical device of claim 53 wherein the pressure sensor is for a centralized electronic brake system.

56. The electrical device of claim 53 further comprising:

a pressure input assembly, the pressure input assembly mounted to the shell, the printed circuit board being disposed between the pressure input assembly and the electrical connector.

57. The electrical device of claim 48 wherein the shell defines an open end, the open end providing access to the electrical connector.

58. The electrical device of claim 57 wherein the shell includes a detent.

59. The electrical device of claim 48 wherein the printed circuit board includes a central processing unit.

60. The electrical device of claim 59 wherein the central processing unit is electrically connected to the contact pad of the printed circuit board.

61. The electrical device of claim 48 wherein the housing includes a shroud, the shroud extending through the open end of the shell, the shroud configured to substantially occupy the open end of the shell.

62. The electrical device of claim 61 wherein the shroud includes a raised segment, the raised segment being engaged with the open end of the shell.

63. The electrical device of claim 61 wherein the shroud includes a locking tab for retentively engaging a mating component.

64. The electrical device of claim 48 wherein the contact assembly includes a contact disc.

65. The electrical device of claim 52 wherein the contact assembly includes a contact disc, the resilient contact disposed between the contact disc and the plunger.

66. The electrical device of claim 56 wherein the pressure input assembly includes an end cap, a pressure barrel, and an interface member, the pressure barrel being mounted to the end cap, and the interface member being mounted to the end cap.

67. The electrical device of claim 66 wherein the interface member includes a plurality of posts, the printed circuit board supported by the posts.

68. The electrical device of claim 66 wherein the end cap includes a bore, the pressure input assembly includes a cavity, and pressurized material can flow through the bore in into the cavity to act upon the pressure barrel.

69. The electrical device of claim 66 wherein the printed circuit board includes a central processing unit, the central processing unit being electrically connected to the contact pad of the printed circuit board, the pressure input assembly includes a wheatstone bridge disposed between the pressure barrel and the interface member, the wheatstone bridge being electrically connected to the central processing unit.

* * * * *

UNITED STATES PATENT AND TRADEMARK OFFICE
CERTIFICATE OF CORRECTION

PATENT NO. : 6,899,568 B2  Page 1 of 1
APPLICATION NO. : 10/341047
DATED : May 31, 2005
INVENTOR(S) : Caines It is certified that error appears in the above-identified patent and that said Letters Patent is hereby corrected as shown below:

Column 9, Line 67: "75.6" should read --756--.

Column 12, Line 31: "electrical-connector" should read --electrical connector--.

Signed and Sealed this

Fifteenth Day of April, 2008

JON W. DUDAS
*Director of the United States Patent and Trademark Office*